(12) United States Patent
Li et al.

(10) Patent No.: US 11,044,614 B2
(45) Date of Patent: Jun. 22, 2021

(54) DOWNLINK CONTROL INFORMATION PROCESSING METHOD AND APPARATUS

(71) Applicant: Huawei Technologies Co., Ltd., Shenzhen (CN)

(72) Inventors: Zhenyu Li, Beijing (CN); Zhijun Li, Beijing (CN); Hantao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 16/522,221

(22) Filed: Jul. 25, 2019

(65) Prior Publication Data
US 2019/0349780 A1     Nov. 14, 2019

Related U.S. Application Data

(63) Continuation of application No. PCT/CN2017/072747, filed on Jan. 26, 2017.

(51) Int. Cl.
*H04W 16/26*     (2009.01)
*H04L 1/00*      (2006.01)
*H04W 72/04*     (2009.01)

(52) U.S. Cl.
CPC ........... *H04W 16/26* (2013.01); *H04L 1/0038* (2013.01); *H04W 72/042* (2013.01)

(58) Field of Classification Search
None
See application file for complete search history.

(56) References Cited

U.S. PATENT DOCUMENTS

2015/0131579 A1*  5/2015  Li ................... H04L 1/1858
                                                   370/329
2015/0131591 A1*  5/2015  Liu .................. H04W 72/042
                                                   370/329

(Continued)

FOREIGN PATENT DOCUMENTS

CN     103716144 A    4/2014
CN     104717748 A    6/2015

(Continued)

OTHER PUBLICATIONS

"Draft CR for the removal of brackets in the EPDCCH blind decoding assignment tables in 36.213," 3GPP TSG-RAN WG1 Meeting #72, R1-130435, St. Julian's, Malta, pp. 1-8, 3rd Generation Partnership Project—Valbonne, France (Jan. 28-Feb. 1, 2013).

(Continued)

*Primary Examiner* — Ruihua Zhang
(74) *Attorney, Agent, or Firm* — Leydig, Voit & Mayer, Ltd.

(57) ABSTRACT

This application provides a downlink control information (DCI) obtaining method and apparatus. The method includes: determining, by a terminal, predefined search space based on aggregation levels supported by the terminal, where the predefined search space includes search space corresponding to at least one of an aggregation level 16 and an aggregation level 24; and performing, blind detection to obtain the DCI. Alternatively, the method includes: determining, by a terminal, blind detection search space of the terminal from predefined search space based on a quantity of resource blocks (RBs) occupied by an enhanced physical downlink control channel (EPDCCH) and aggregation levels supported by the terminal, where the predefined search space includes corresponding search space obtained when the RB quantity is 16; and performing, blind detection to obtain the DCI. According to this application, a downlink (Continued)

coverage gain can be increased, and diversity of implementations of downlink coverage enhancement can be improved.

15 Claims, 9 Drawing Sheets

(56) References Cited

U.S. PATENT DOCUMENTS

| | | | | |
|---|---|---|---|---|
| 2015/0201405 | A1* | 7/2015 | Liu | H04L 5/0053 370/329 |
| 2015/0327223 | A1* | 11/2015 | Zhang | H04L 5/0053 370/329 |
| 2016/0338018 | A1 | 11/2016 | Awad et al. | |
| 2017/0006584 | A1 | 1/2017 | Ren et al. | |
| 2017/0359805 | A1 | 12/2017 | You et al. | |
| 2020/0037186 | A1* | 1/2020 | Thangarasa | H04L 1/1812 |

FOREIGN PATENT DOCUMENTS

| | | |
|---|---|---|
| CN | 104782068 A | 7/2015 |
| CN | 105210321 A | 12/2015 |
| CN | 105940634 A | 9/2016 |
| EP | 3282614 A1 | 2/2018 |
| EP | 3291474 A1 | 3/2018 |
| EP | 3297194 A1 | 3/2018 |
| WO | 2013139012 A1 | 9/2013 |
| WO | 2016080772 A1 | 5/2016 |
| WO | 2016161958 A1 | 10/2016 |
| WO | 2016175486 A1 | 11/2016 |
| WO | 2016184239 A1 | 11/2016 |

OTHER PUBLICATIONS

"Views on Search Space Design for Multiple EPDCCH Sets," 3GPP TSG RAN WG1 Meeting #71, R1-124841, New Orleans, USA, pp. 1-4, 3rd Generation Partnership Project—Valbonne, France (Nov. 12-16, 2012).

"3rd Generation Partnership Project; Technical Specification Group Radio Access Network; Evolved Universal Terrestrial Radio Access (E-UTRA); Physical channels and modulation (Release 13)," 3GPP TS 36.211 V13.4.0, pp. 1-171, (Dec. 2016), 3rd Generation Partnership Project—Valbonne, France (Dec. 2016).

"3rd Generation Partnership Project; Technical Specification Group Radio Access Network; Evolved Universal Terrestrial Radio Access (E-UTRA); Physical Channels and Modulation (Release 13)," 3GPP TS 36.211, V13.1.0, pp. 1-155, 3rd Generation Partnership Project, Valbonne, France (Mar. 2016).

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.1.0, pp. 1-129, 3rd Generation Partnership Project, Valbonne, France (Mar. 2016).

"3rd Generation Partnership Project; Technical Specification Group Radio Access Network; Evolved Universal Terrestrial Radio Access (E-UTRA); Physical Layer Procedures (Release 13)," 3GPP TS 36.213, V13.1.0, pp. 1-361, 3rd Generation Partnership Project, Valbonne, France (Mar. 2016).

"3rd Generation Partnership Project; Technical Specification Group Radio Access Network; Evolved Universal Terrestrial Radio Access (E-UTRA); Radio Resource Control (RRC); Protocol Specification (Release 13)," 3GPP TS 36.331, V13.1.0, pp. 1-551, 3rd Generation Partnership Project, Valbonne, France (Mar. 2016).

ZTE,"Further considerations on M-PDCCH for MTC," 3GPP TSG RAN WG1 Meeting #82, Beijing, China, R1-154432, total 9 pages, 3rd Generation Partnership Project, Valbonne, France (Aug. 24-28, 2015).

* cited by examiner

US 11,044,614 B2

DOWNLINK CONTROL INFORMATION PROCESSING METHOD AND APPARATUS

CROSS-REFERENCE TO RELATED APPLICATIONS

This application is a continuation of International Application No. PCT/CN2017/072747, filed on Jan. 26, 2017, the disclosure of which is hereby incorporated by reference in its entirety.

TECHNICAL FIELD

The present disclosure relates to the field of communications technologies, and in particular, to a downlink control information processing method and apparatus.

BACKGROUND

Currently, increasing popularity of long term evolution (LTE) applications requires deep signal coverage in more application scenarios. In other words, signal coverage for a cell-edge user needs to be enhanced, so that the user obtains control information required by the user. An LTE coverage enhancement technology includes an uplink coverage enhancement technology and a downlink coverage enhancement technology. The downlink coverage enhancement technology includes increasing an output power, increasing a quantity of transmit antennas, or the like. An LTE small cell is a small cell with features such as rapid deployment, easy installation, and a small size. There are more applications based on the LTE small cell. However, in an application scenario of the LTE small cell, a downlink transmit power of the LTE small cell is related to a maximum transmit power of a terminal, and therefore downlink coverage enhancement cannot be implemented by increasing an output power. Due to the small size of the LTE small cell, downlink coverage enhancement cannot be implemented by increasing a quantity of antennas, either. Therefore, downlink coverage enhancement becomes one of urgent technical problems to be resolved in the LTE small cell currently.

A standard of an Internet of Things application scenario (such as: eMTC) is introduced in the LTE R13 standard. To implement downlink coverage enhancement, an MTC (Machine Type Communication) physical downlink control channel (MPDCCH) is used in eMTC. A receive end supporting the MPDCCH obtains a coverage gain by merging time-domain data. However, currently, most terminals do not support the MPDCCH. If coverage enhancement needs to be obtained in an MPDCCH manner, a hardware structure of a terminal needs to be redesigned, resulting in great operation difficulty and low adaptability.

In addition, a method similar to a transmission time interval bundling (TTI Bundling) technology in the uplink coverage enhancement technology is further used to implement downlink coverage enhancement in the prior art. A downlink transmit end repeatedly sends data through a plurality of TTIs, and a receive end merges the data repeatedly sent by the transmit end, to demodulate the data, so as to obtain a coverage gain. In the prior art, when the coverage gain is obtained in a time domain repetition manner, a data processing delay of a system greatly increases, and a throughput rate of the system is reduced. In addition, a time sequence design of a hybrid automatic repeat request (HARQ) further needs to be considered for the time domain repetition manner, resulting in high implementation complexity and low adaptability.

SUMMARY

This application provides a downlink control information processing method and apparatus, to increase a downlink coverage gain and improve diversity of implementations of downlink coverage enhancement.

According to a first aspect, a downlink control information obtaining method is provided, and the method may include:

determining, by a terminal, predefined search space based on aggregation levels supported by the terminal, where the predefined search space includes search space corresponding to at least one of an aggregation level 16 and an aggregation level 24; and performing, by the terminal, blind detection in the predefined search space to obtain downlink control information DCI.

Optionally, the aggregation levels supported by the terminal includes the aggregation level 16;

the predefined search space includes a common search space size and a terminal-specific search space size that correspond to the aggregation level 16, a physical downlink control channel Number of PDCCH candidates corresponding to the common search space size, and a Number of PDCCH candidates corresponding to the terminal-specific search space size;

the common search space size corresponding to the aggregation level 16 is 16, and the Number of PDCCH candidates corresponding to the common search space size is 1; and the terminal-specific search space size corresponding to the aggregation level 16 is 16, and the Number of PDCCH candidates corresponding to the terminal-specific search space size is 1.

Optionally, the aggregation levels supported by the terminal includes the aggregation level 24;

the predefined search space includes a common search space size and a terminal-specific search space size that correspond to the aggregation level 24, a Number of PDCCH candidates corresponding to the common search space size, and a Number of PDCCH candidates corresponding to the terminal-specific search space size;

the common search space size corresponding to the aggregation level 24 is 24, and the Number of PDCCH candidates corresponding to the common search space size is 1; and the terminal-specific search space size corresponding to the aggregation level 24 is 24, and the Number of PDCCH candidates corresponding to the terminal-specific search space size is 1.

Optionally, the aggregation levels supported by the terminal includes the aggregation levels 16 and 24;

the predefined search space includes common search space sizes and terminal-specific search space sizes that correspond to the aggregation levels 16 and 24, PDCCH candidate quantities corresponding to the common search space sizes corresponding to the aggregation levels 16 and 24, and PDCCH candidate quantities corresponding to the terminal-specific search space sizes corresponding to the aggregation levels 16 and 24;

the common search space size corresponding to the aggregation level 16 is 16, and the Number of PDCCH candidates corresponding to the common search space size corresponding to the aggregation level 16 is 1;

the terminal-specific search space size corresponding to the aggregation level 16 is 16, and the Number of PDCCH candidates corresponding to the terminal-specific search space size corresponding to the aggregation level 16 is 1;

the common search space size corresponding to the aggregation level 24 is 24, and the Number of PDCCH candidates corresponding to the common search space size corresponding to the aggregation level 24 is 1; and the terminal-specific search space size corresponding to the aggregation level 24 is 24, and the Number of PDCCH candidates corresponding to the terminal-specific search space size corresponding to the aggregation level 24 is 1.

Optionally, the aggregation levels supported by the terminal includes the aggregation levels 16 and 24;

the predefined search space includes common search space sizes and terminal-specific search space sizes that correspond to the aggregation levels 16 and 24, PDCCH candidate quantities corresponding to the common search space sizes corresponding to the aggregation levels 16 and 24, and PDCCH candidate quantities corresponding to the terminal-specific search space sizes corresponding to the aggregation levels 16 and 24;

the common search space size corresponding to the aggregation level 16 is 16, and the Number of PDCCH candidates corresponding to the common search space size corresponding to the aggregation level 16 is 1;

the terminal-specific search space size corresponding to the aggregation level 16 is 32, and the Number of PDCCH candidates corresponding to the terminal-specific search space size corresponding to the aggregation level 16 is 2;

the common search space size corresponding to the aggregation level 24 is 24, and the Number of PDCCH candidates corresponding to the common search space size corresponding to the aggregation level 24 is 1; and the terminal-specific search space size corresponding to the aggregation level 24 is 48, and the Number of PDCCH candidates corresponding to the terminal-specific search space size corresponding to the aggregation level 24 is 2.

Optionally, before the determining, by a terminal, predefined search space based on aggregation levels supported by the terminal, the method further includes:

reporting, by the terminal to a base station, at least one aggregation level supported by the terminal, where the DCI is carried on a physical resource corresponding to an aggregation level N in the at least one aggregation level.

Optionally, before the reporting, by the terminal to a base station, at least one aggregation level supported by the terminal, the method further includes:

obtaining, by the terminal, a broadcast message of the base station, and determining, based on the broadcast message, aggregation levels supported by a cell in which the terminal is located; and the reporting, by the terminal to a base station, at least one aggregation level supported by the terminal includes:

searching, by the terminal, the aggregation levels supported by the cell for the aggregation levels supported by the terminal, selecting the at least one aggregation level from the aggregation levels supported by the terminal, and reporting the selected at least one aggregation level to the base station.

In this application, aggregation levels supported by a cell and the aggregation levels supported by the terminal may be extended to the aggregation level 16 or 24, and the base station may adapt the DCI to be delivered to the UE to a larger physical resource. If an information bit does not change, a PDCCH transmission bit rate is reduced to obtain a PDCCH coverage gain. When delivering the DCI to the UE, the base station no longer directly determines, based on the aggregation levels supported by the cell, an aggregation level corresponding to the physical resource used to carry the DCI, but selects an aggregation level from the aggregation levels supported by the UE, adds the DCI to be delivered to the terminal to a physical resource corresponding to the aggregation level, and delivers the DCI to the UE. Therefore, an operation is more flexible, association is stronger, and applicability is higher. When performing PDCCH blind detection, the terminal only needs to perform blind detection in search space corresponding to each aggregation level reported by the terminal, and does not need to perform blind detection in search space corresponding to all aggregation levels supported by the cell or all aggregation levels supported by the terminal. This reduces DCI processing complexity, and can improve DCI processing efficiency.

According to a second aspect, a downlink control information obtaining method is provided, and the method may include:

determining, by a terminal, blind detection search space of the terminal from predefined search space based on a quantity of resource blocks RB occupied by an enhanced physical downlink control channel EPDCCH and aggregation levels supported by the terminal, where the predefined search space includes search space corresponding to an RB quantity 16; and performing, by the terminal, blind detection in the blind detection search space to obtain downlink control information DCI.

Optionally, the predefined search space includes number of EPDCCH candidates corresponds to the quantity of RBs occupied by the EPDCCH at each aggregation level, as shown in Table 1:

TABLE 1

| $N_{RB}^{X_p}$ | Number of EPDCCH candidates | | | | | |
|---|---|---|---|---|---|---|
| | L = 2 | L = 4 | L = 8 | L = 16 | L = 32 | L = 64 |
| 2 | 4 | 2 | 1 | 0 | 0 | 0 |
| 4 | 8 | 4 | 2 | 1 | 0 | 0 |
| 8 | 6 | 4 | 3 | 2 | 1 | 0 |
| 16 | 6 | 4 | 3 | 2 | 2 | 1 |

$N_{RB}^{X_p}$ where RBs represents the quantity of RBs occupied by the EPDCCH, and L represents the aggregation level.

Optionally, the predefined search space includes number of EPDCCH candidates corresponds to the quantity of RBs occupied by the EPDCCH at each aggregation level, as shown in Table 2:

TABLE 2

| $N_{RB}^{X_p}$ | Number of EPDCCH candidates | | | | | |
|---|---|---|---|---|---|---|
| | L = 1 | L = 2 | L = 4 | L = 8 | L = 16 | L = 32 |
| 2 | 4 | 2 | 1 | 0 | 0 | 0 |
| 4 | 8 | 4 | 2 | 1 | 0 | 0 |
| 8 | 6 | 4 | 3 | 2 | 1 | 0 |
| 16 | 6 | 4 | 3 | 2 | 2 | 1 | where $N_{RB}^{X_p}$ represents the quantity of RBs occupied by the EPDCCH, and L represents the aggregation level.

Optionally, the predefined search space includes number of EPDCCH candidates corresponds to the quantity of RBs occupied by the EPDCCH at each aggregation level, as shown in Table 3:

TABLE 3

| | Number of EPDCCH candidates | | | | | |
|---|---|---|---|---|---|---|
| $N_{RB}^{Xp}$ | L = 1 | L = 2 | L = 4 | L = 8 | L = 16 | L = 32 |
| 2 | 8 | 4 | 2 | 1 | 0 | 0 |
| 4 | 4 | 5 | 4 | 2 | 1 | 0 |
| 8 | 4 | 4 | 4 | 2 | 2 | 0 |
| 16 | 4 | 4 | 4 | 2 | 2 | 1 | where $N_{RB}^{Xp}$ represents the quantity of RBs occupied by the EPDCCH, and L represents the aggregation level.

Optionally, the predefined search space includes number of EPDCCH candidates corresponds to the quantity of RBs occupied by the EPDCCH at each aggregation level, as shown in Table 4:

TABLE 4

| | Number of EPDCCH candidates | | | | |
|---|---|---|---|---|---|
| $N_{RB}^{Xp}$ | L = 2 | L = 4 | L = 8 | L = 16 | L = 32 |
| 2 | 4 | 2 | 1 | 0 | 0 |
| 4 | 8 | 4 | 2 | 1 | 0 |
| 8 | 6 | 6 | 2 | 2 | 0 |
| 16 | 6 | 6 | 2 | 2 | 2 | where $N_{RB}^{Xp}$ represents the quantity of RBs occupied by the EPDCCH, and L represents the aggregation level.

Optionally, the predefined search space includes number of EPDCCH candidates corresponds to the quantity of RBs occupied by the EPDCCH at each aggregation level, as shown in Table 5:

TABLE 5

| | Number of EPDCCH candidates | | | | |
|---|---|---|---|---|---|
| $N_{RB}^{Xp}$ | L = 1 | L = 2 | L = 4 | L = 8 | L = 16 |
| 2 | 4 | 2 | 1 | 0 | 0 |
| 4 | 8 | 4 | 2 | 1 | 0 |
| 8 | 6 | 6 | 2 | 2 | 0 |
| 16 | 6 | 6 | 2 | 2 | 2 | where $N_{RB}^{Xp}$ represents the quantity of RBs occupied by the EPDCCH, and L represents the aggregation level.

Optionally, the predefined search space includes number of EPDCCH candidates corresponds to the quantity of RBs occupied by the EPDCCH at each aggregation level, as shown in Table 6:

TABLE 6

| | Number of EPDCCH candidates | | | | |
|---|---|---|---|---|---|
| $N_{RB}^{Xp}$ | L = 1 | L = 2 | L = 4 | L = 8 | L = 16 |
| 2 | 8 | 4 | 2 | 1 | 0 |
| 4 | 6 | 6 | 2 | 2 | 0 |
| 8 | 6 | 6 | 2 | 2 | 0 |
| 16 | 6 | 6 | 2 | 2 | 2 | where $N_{RB}^{Xp}$ represents the quantity of RBs occupied by the EPDCCH, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 7:

TABLE 7

| | | Number of EPDCCH candidates $[M_{p1}^{(L)}, M_{p2}^{(L)}]$ | | | | | |
|---|---|---|---|---|---|---|---|
| $N_{RB}^{Xp1}$ | $N_{RB}^{Xp2}$ | L = 2 | L = 4 | L = 8 | L = 16 | L = 32 | L = 64 |
| 2 | 2 | 4, 4 | 2, 2 | 1, 1 | 0, 0 | 0, 0 | 0, 0 |
| 4 | 4 | 3, 3 | 3, 3 | 1, 1 | 1, 1 | 0, 0 | 0, 0 |
| 8 | 8 | 3, 3 | 2, 2 | 1, 1 | 1, 1 | 1, 1 | 0, 0 |
| 16 | 16 | 3, 3 | 2, 2 | 1, 1 | 1, 1 | 1, 1 | 1, 1 |
| 4 | 2 | 5, 3 | 3, 2 | 1, 1 | 1, 0 | 0, 0 | 0, 0 |
| 8 | 2 | 4, 2 | 4, 2 | 1, 1 | 1, 0 | 1, 0 | 0, 0 |
| 8 | 4 | 3, 3 | 2, 2 | 2, 1 | 1, 1 | 1, 0 | 0, 0 |
| 16 | 2 | 5, 3 | 3, 2 | 1, 1 | 1, 0 | 0, 0 | 1, 0 |
| 16 | 4 | 4, 2 | 4, 2 | 1, 1 | 1, 0 | 1, 0 | 1, 0 |
| 16 | 8 | 3, 3 | 2, 2 | 2, 1 | 1, 1 | 1, 0 | 1, 0 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 8:

TABLE 8

| | | Number of EPDCCH candidates $[M_{p1}^{(L)}, M_{p2}^{(L)}]$ | | | | | |
|---|---|---|---|---|---|---|---|
| $N_{RB}^{Xp1}$ | $N_{RB}^{Xp2}$ | L = 1 | L = 2 | L = 4 | L = 8 | L = 16 | L = 32 |
| 2 | 2 | 4, 4 | 2, 2 | 1, 1 | 0, 0 | 0, 0 | 0, 0 |
| 4 | 4 | 3, 3 | 3, 3 | 1, 1 | 1, 1 | 0, 0 | 0, 0 |
| 8 | 8 | 3, 3 | 2, 2 | 1, 1 | 1, 1 | 1, 1 | 0, 0 |
| 16 | 16 | 3, 3 | 2, 2 | 1, 1 | 1, 1 | 1, 1 | 1, 1 |
| 4 | 2 | 5, 3 | 3, 2 | 1, 1 | 1, 0 | 0, 0 | 0, 0 |
| 8 | 2 | 4, 2 | 4, 2 | 1, 1 | 1, 0 | 1, 0 | 0, 0 |
| 8 | 4 | 3, 3 | 2, 2 | 2, 1 | 1, 1 | 1, 0 | 0, 0 |
| 16 | 2 | 5, 3 | 3, 2 | 1, 1 | 1, 0 | 0, 0 | 1, 0 |
| 16 | 4 | 4, 2 | 4, 2 | 1, 1 | 1, 0 | 1, 0 | 1, 0 |
| 16 | 8 | 3, 3 | 2, 2 | 2, 1 | 1, 1 | 1, 0 | 1, 0 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 9:

TABLE 9

| | | Number of EPDCCH candidates $[M_{p1}^{(L)}, M_{p2}^{(L)}]$ | | | | | |
|---|---|---|---|---|---|---|---|
| $N_{RB}^{Xp1}$ | $N_{RB}^{Xp2}$ | L = 1 | L = 2 | L = 4 | L = 8 | L = 16 | L = 32 |
| 2 | 2 | 2, 2 | 3, 3 | 2, 2 | 1, 1 | 0, 0 | 0, 0 |
| 4 | 4 | 2, 2 | 2, 2 | 2, 2 | 1, 1 | 1, 1 | 0, 0 |

TABLE 9-continued

| | | \multicolumn{6}{c|}{Number of EPDCCH candidates [$M_{p1}^{(L)}$, $M_{p2}^{(L)}$]} |
|---|---|---|---|---|---|---|---|
| $N_{RB}^{Xp1}$ | $N_{RB}^{Xp2}$ | L = 1 | L = 2 | L = 4 | L = 8 | L = 16 | L = 32 |
| 8 | 8 | 2, 2 | 2, 2 | 2, 2 | 1, 1 | 1, 1 | 0, 0 |
| 16 | 16 | 2, 2 | 2, 2 | 2, 2 | 1, 1 | 1, 1 | 1, 1 |
| 4 | 2 | 3, 1 | 3, 2 | 3, 1 | 1, 1 | 1, 0 | 0, 0 |
| 8 | 2 | 3, 1 | 4, 1 | 3, 1 | 1, 1 | 1, 0 | 0, 0 |
| 8 | 4 | 2, 2 | 2, 2 | 2, 2 | 1, 1 | 1, 1 | 0, 0 |
| 16 | 2 | 3, 1 | 3, 2 | 3, 1 | 1, 1 | 1, 0 | 1, 0 |
| 16 | 4 | 3, 1 | 4, 1 | 3, 1 | 1, 1 | 1, 0 | 1, 0 |
| 16 | 8 | 2, 2 | 2, 2 | 2, 2 | 1, 1 | 1, 1 | 1, 0 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 10:

TABLE 10

| | | \multicolumn{5}{c|}{Number of EPDCCH candidates [$M_{p1}^{(L)}$, $M_{p2}^{(L)}$]} |
|---|---|---|---|---|---|---|
| $N_{RB}^{Xp1}$ | $N_{RB}^{Xp2}$ | L = 2 | L = 4 | L = 8 | L = 16 | L = 32 |
| 2 | 2 | 4, 4 | 2, 2 | 1, 1 | 0, 0 | 0, 0 |
| 4 | 4 | 3, 3 | 3, 3 | 1, 1 | 1, 1 | 0, 0 |
| 8 | 8 | 3, 3 | 3, 3 | 1, 1 | 1, 1 | 0, 0 |
| 16 | 16 | 3, 3 | 3, 3 | 1, 1 | 1, 1 | 1, 1 |
| 4 | 2 | 4, 3 | 4, 2 | 1, 1 | 1, 0 | 0, 0 |
| 8 | 2 | 5, 2 | 4, 2 | 1, 1 | 1, 0 | 0, 0 |
| 8 | 4 | 3, 3 | 3, 3 | 1, 1 | 1, 1 | 0, 0 |
| 16 | 2 | 4, 3 | 4, 2 | 1, 1 | 1, 0 | 1, 0 |
| 16 | 4 | 5, 2 | 4, 2 | 1, 1 | 1, 0 | 1, 0 |
| 16 | 8 | 3, 3 | 3, 3 | 1, 1 | 1, 1 | 1, 0 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 11:

TABLE 11

| | | \multicolumn{5}{c|}{Number of EPDCCH candidates [$M_{p1}^{(L)}$, $M_{p2}^{(L)}$]} |
|---|---|---|---|---|---|---|
| $N_{RB}^{Xp1}$ | $N_{RB}^{Xp2}$ | L = 1 | L = 2 | L = 4 | L = 8 | L = 16 |
| 2 | 2 | 4, 4 | 2, 2 | 1, 1 | 0, 0 | 0, 0 |
| 4 | 4 | 3, 3 | 3, 3 | 1, 1 | 1, 1 | 0, 0 |
| 8 | 8 | 3, 3 | 3, 3 | 1, 1 | 1, 1 | 0, 0 |
| 16 | 16 | 3, 3 | 3, 3 | 1, 1 | 1, 1 | 1, 1 |
| 4 | 2 | 4, 3 | 4, 2 | 1, 1 | 1, 0 | 0, 0 |
| 8 | 2 | 5, 2 | 4, 2 | 1, 1 | 1, 0 | 0, 0 |
| 8 | 4 | 3, 3 | 3, 3 | 1, 1 | 1, 1 | 0, 0 |
| 16 | 2 | 4, 3 | 4, 2 | 1, 1 | 1, 0 | 1, 0 |
| 16 | 4 | 5, 2 | 4, 2 | 1, 1 | 1, 0 | 1, 0 |
| 16 | 8 | 3, 3 | 3, 3 | 1, 1 | 1, 1 | 1, 0 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 12:

TABLE 12

| | | \multicolumn{5}{c|}{Number of EPDCCH candidates [$M_{p1}^{(L)}$, $M_{p2}^{(L)}$]} |
|---|---|---|---|---|---|---|
| $N_{RB}^{Xp1}$ | $N_{RB}^{Xp2}$ | L = 1 | L = 2 | L = 4 | L = 8 | L = 16 |
| 2 | 2 | 3, 3 | 3, 3 | 1, 1 | 1, 1 | 0, 0 |
| 4 | 4 | 3, 3 | 3, 3 | 1, 1 | 1, 1 | 0, 0 |
| 8 | 8 | 3, 3 | 3, 3 | 1, 1 | 1, 1 | 0, 0 |
| 16 | 16 | 3, 3 | 3, 3 | 1, 1 | 1, 1 | 1, 1 |
| 4 | 2 | 4, 2 | 4, 2 | 1, 1 | 1, 1 | 0, 0 |
| 8 | 2 | 4, 2 | 4, 2 | 1, 1 | 1, 1 | 0, 0 |
| 8 | 4 | 3, 3 | 3, 3 | 1, 1 | 1, 1 | 0, 0 |
| 16 | 2 | 4, 2 | 4, 2 | 1, 1 | 1, 1 | 1, 0 |
| 16 | 4 | 4, 2 | 4, 2 | 1, 1 | 1, 1 | 1, 0 |
| 16 | 8 | 3, 3 | 3, 3 | 1, 1 | 1, 1 | 1, 0 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 13:

TABLE 13

| | | \multicolumn{6}{c|}{Number of EPDCCH candidates [$M_{p1}^{(L)}$, $M_{p2}^{(L)}$]} |
|---|---|---|---|---|---|---|---|
| $N_{RB}^{Xp1}$ | $N_{RB}^{Xp2}$ | L = 2 | L = 4 | L = 8 | L = 16 | L = 32 | L = 64 |
| 2 | 2 | 4, 4 | 2, 2 | 1, 1 | 0, 0 | 0, 0 | 0, 0 |
| 4 | 4 | 4, 2 | 4, 3 | 0, 2 | 0, 1 | 0, 0 | 0, 0 |
| 8 | 8 | 4, 1 | 4, 2 | 0, 2 | 0, 2 | 0, 1 | 0, 0 |
| 16 | 16 | 4, 1 | 4, 2 | 0, 2 | 0, 2 | 0, 1 | 1, 1 |
| 2 | 4 | 4, 3 | 2, 4 | 0, 2 | 0, 1 | 0, 0 | 0, 0 |
| 2 | 8 | 4, 1 | 2, 2 | 0, 4 | 0, 2 | 0, 1 | 0, 0 |
| 2 | 16 | 4, 1 | 2, 2 | 0, 4 | 0, 2 | 0, 1 | 0, 1 |
| 4 | 2 | 5, 2 | 4, 2 | 1, 1 | 1, 0 | 0, 0 | 0, 0 |
| 4 | 8 | 4, 1 | 4, 2 | 0, 2 | 0, 2 | 0, 1 | 0, 0 |
| 4 | 16 | 4, 1 | 4, 2 | 0, 2 | 0, 2 | 0, 1 | 0, 1 |
| 8 | 2 | 5, 1 | 4, 2 | 2, 1 | 1, 0 | 0, 0 | 0, 0 |
| 8 | 4 | 6, 1 | 4, 2 | 0, 2 | 0, 1 | 0, 0 | 0, 0 |
| 8 | 16 | 6, 1 | 4, 2 | 0, 2 | 0, 1 | 0, 0 | 0, 1 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 14:

TABLE 14

| | | Number of EPDCCH candidates $[M_{p1}^{(L)}, M_{p2}^{(L)}]$ | | | | | |
|---|---|---|---|---|---|---|---|
| $N_{RB}^{Xp1}$ | $N_{RB}^{Xp2}$ | L = 1 | L = 2 | L = 4 | L = 8 | L = 16 | L = 32 |
| 2 | 2 | 4, 4 | 2, 2 | 1, 1 | 0, 0 | 0, 0 | 0, 0 |
| 4 | 4 | 4, 2 | 4, 3 | 0, 2 | 0, 1 | 0, 0 | 0, 0 |
| 8 | 8 | 4, 1 | 4, 2 | 0, 2 | 0, 2 | 0, 1 | 0, 0 |
| 16 | 16 | 4, 1 | 4, 2 | 0, 2 | 0, 2 | 0, 1 | 1, 1 |
| 2 | 4 | 4, 3 | 2, 4 | 0, 2 | 0, 1 | 0, 0 | 0, 0 |
| 2 | 8 | 4, 1 | 2, 2 | 0, 4 | 0, 2 | 0, 1 | 0, 0 |
| 2 | 16 | 4, 1 | 2, 2 | 0, 4 | 0, 2 | 0, 1 | 0, 1 |
| 4 | 2 | 5, 2 | 4, 2 | 1, 1 | 1, 0 | 0, 0 | 0, 0 |
| 4 | 8 | 4, 1 | 4, 2 | 0, 2 | 0, 2 | 0, 1 | 0, 0 |
| 4 | 16 | 4, 1 | 4, 2 | 0, 2 | 0, 2 | 0, 1 | 0, 1 |
| 8 | 2 | 5, 1 | 4, 2 | 2, 1 | 1, 0 | 0, 0 | 0, 0 |
| 8 | 4 | 6, 1 | 4, 2 | 0, 2 | 0, 1 | 0, 0 | 0, 0 |
| 8 | 16 | 6, 1 | 4, 2 | 0, 2 | 0, 1 | 0, 0 | 0, 1 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space includes number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 15:

TABLE 15

| | | Number of EPDCCH candidates $[M_{p1}^{(L)}, M_{p2}^{(L)}]$ | | | | | |
|---|---|---|---|---|---|---|---|
| $N_{RB}^{Xp1}$ | $N_{RB}^{Xp2}$ | L = 1 | L = 2 | L = 4 | L = 8 | L = 16 | L = 32 |
| 2 | 2 | 4, 1 | 4, 2 | 2, 2 | 0, 1 | 0, 0 | 0, 0 |
| 4 | 4 | 4, 1 | 4, 1 | 2, 2 | 0, 1 | 0, 1 | 0, 0 |
| 8 | 8 | 4, 1 | 4, 1 | 2, 2 | 0, 1 | 0, 1 | 0, 0 |
| 16 | 16 | 4, 1 | 4, 1 | 2, 2 | 0, 1 | 0, 1 | 1, 1 |
| 2 | 4 | 4, 1 | 4, 1 | 2, 2 | 0, 1 | 0, 1 | 0, 0 |
| 2 | 8 | 4, 1 | 4, 1 | 2, 2 | 0, 1 | 0, 1 | 0, 0 |
| 2 | 16 | 4, 1 | 4, 1 | 2, 2 | 0, 1 | 0, 1 | 0, 1 |
| 4 | 2 | 4, 1 | 4, 1 | 2, 2 | 1, 1 | 0, 0 | 0, 0 |
| 4 | 8 | 4, 1 | 4, 1 | 2, 2 | 0, 1 | 0, 1 | 0, 0 |
| 4 | 16 | 4, 1 | 4, 1 | 2, 2 | 0, 1 | 0, 1 | 0, 1 |
| 8 | 2 | 4, 1 | 4, 1 | 4, 1 | 0, 1 | 0, 0 | 0, 0 |
| 8 | 4 | 4, 1 | 4, 1 | 2, 2 | 0, 1 | 0, 1 | 0, 0 |
| 8 | 16 | 4, 1 | 4, 1 | 2, 2 | 0, 1 | 0, 1 | 0, 1 | where $N_{RB}^{Xp1}$ represents the quantity of RBs occupied by the EPDCCH in the Xp1, $N_{RB}^{Xp2}$ represents the quantity of RBs occupied by the EPDCCH in the Xp2, and L represents the aggregation level.

Optionally, the predefined search space further includes search space corresponding to an RB quantity 32, and a corresponding aggregation level obtained when the RB quantity is 32 includes 128.

In this application, an EPDCCH candidate user set for detection may be extended, and the quantity of RBs occupied by the EPDCCH and the aggregation levels supported by the UE may be extended, so that the EPDCCH candidate user set may be extended, and a channel coverage area of the EPDCCH may be extended, thereby increasing a channel coverage gain of the EPDCCH.

According to a third aspect, a downlink control information obtaining method is provided, and the method may include:

reporting, by a terminal to a base station, at least one aggregation level supported by the terminal, where the at least one aggregation level includes an aggregation level N;

performing, by the terminal based on each of the at least one aggregation level, blind detection on downlink control information DCI delivered by the base station;

merging, by the terminal, frequency-domain data of two pieces of same DCI carried on two physical downlink control channel PDCCH physical resources if blind detection performed by the terminal on the two pieces of same DCI based on the aggregation level N fails; and performing, by the terminal based on the aggregation level N, blind detection on a result of merging the frequency-domain data, to obtain the DCI delivered by the base station.

Optionally, before the reporting, by a terminal to a base station, at least one aggregation level supported by the terminal, the method further includes:

reporting, by the terminal to the base station, a message indicating that the terminal has a frequency-domain data merging capability, where the message is provided for the base station to determine whether to repeatedly send the DCI for the terminal on the two PDCCH physical resources corresponding to the aggregation level N.

According to a fourth aspect, a downlink control information delivering method is provided, and the method may include:

receiving, by a base station, at least one aggregation level that is reported by a terminal and that is supported by the terminal, where the at least one aggregation level includes an aggregation level N;

splitting, by the base station, downlink control information DCI used to control the terminal into first DCI and second DCI; and sending, by the base station, the first DCI and the second DCI to the terminal, where the first DCI and the second DCI are separately carried on two different physical downlink control channel PDCCH physical resources corresponding to the aggregation level N, and the first DCI and the second DCI are used by the terminal to perform joint parsing, where N is a natural number.

Optionally, the method further includes: receiving, by the base station, a message reported by the terminal, and determining, based on the message, that the terminal has a frequency-domain data merging capability.

Optionally, before the splitting, by the base station, DCI for the terminal into first DCI and second DCI, the method further includes:

determining, by the base station, that the terminal has a frequency-domain data merging capability, including:

obtaining, by the base station, a preamble of a physical random access channel of the terminal, and determining, based on the preamble, that the terminal has the frequency-domain data merging capability.

In this application, the base station may deliver, on the two different PDCCH physical resources at a same TTI, the DCI for the UE, in other words, the base station may repeatedly deliver, twice at a same TTI, the DCI for the UE. A higher coverage gain is obtained through frequency-domain data merging, an operation is simpler, and applicability is higher.

According to a fifth aspect, a downlink control information obtaining method is provided, and the method may include:

reporting, by a terminal to a base station, at least one aggregation level supported by the terminal, where the at least one aggregation level includes an aggregation level N;

performing, by the terminal based on each of the at least one aggregation level, blind detection on downlink control information DCI delivered by the base station; and jointly assembling, by the terminal, first DCI and second DCI that are carried on two physical downlink control channel PDCCH physical resources if blind detection performed by the terminal on the first DCI and the second DCI based on the aggregation level N succeeds, to obtain the DCI delivered by the base station.

Optionally, the method further includes:

reporting, by the terminal to the base station, a message indicating that the terminal has a frequency-domain data merging capability.

In this application, the base station allocates two candidate physical resources (namely, candidate CCE resources) corresponding to the aggregation level N to the to-be-transmitted DCI. In other words, information bits carried on each candidate user CCE resource corresponding to the aggregation level N are halved. In essence, a transmission bit rate is reduced. A coverage gain is obtained from reducing the bit rate, so that diversity of implementations of coverage enhancement is improved, and applicability is higher.

According to a sixth aspect, a terminal is provided, and the terminal may include:

a determining module, configured to determine predefined search space based on aggregation levels supported by the terminal, where the predefined search space includes search space corresponding to at least one of an aggregation level 16 and an aggregation level 24; and a searching module, configured to perform blind detection in the predefined search space determined by the determining module to obtain downlink control information DCI.

Optionally, the aggregation levels supported by the terminal includes the aggregation level 16;

the predefined search space includes a common search space size and a terminal-specific search space size that correspond to the aggregation level 16, a physical downlink control channel Number of PDCCH candidates corresponding to the common search space size, and a Number of PDCCH candidates corresponding to the terminal-specific search space size;

the common search space size corresponding to the aggregation level 16 is 16, and the Number of PDCCH candidates corresponding to the common search space size is 1; and the terminal-specific search space size corresponding to the aggregation level 16 is 16, and the Number of PDCCH candidates corresponding to the terminal-specific search space size is 1.

Optionally, the aggregation levels supported by the terminal includes the aggregation level 24;

the predefined search space includes a common search space size and a terminal-specific search space size that correspond to the aggregation level 24, a Number of PDCCH candidates corresponding to the common search space size, and a Number of PDCCH candidates corresponding to the terminal-specific search space size;

the common search space size corresponding to the aggregation level 24 is 24, and the Number of PDCCH candidates corresponding to the common search space size is 1; and the terminal-specific search space size corresponding to the aggregation level 24 is 24, and the Number of PDCCH candidates corresponding to the terminal-specific search space size is 1.

Optionally, the aggregation levels supported by the terminal includes the aggregation levels 16 and 24;

the predefined search space includes common search space sizes and terminal-specific search space sizes that correspond to the aggregation levels 16 and 24, PDCCH candidate quantities corresponding to the common search space sizes corresponding to the aggregation levels 16 and 24, and PDCCH candidate quantities corresponding to the terminal-specific search space sizes corresponding to the aggregation levels 16 and 24;

the common search space size corresponding to the aggregation level 16 is 16, and the Number of PDCCH candidates corresponding to the common search space size corresponding to the aggregation level 16 is 1;

the terminal-specific search space size corresponding to the aggregation level 16 is 16, and the Number of PDCCH candidates corresponding to the terminal-specific search space size corresponding to the aggregation level 16 is 1;

the common search space size corresponding to the aggregation level 24 is 24, and the Number of PDCCH candidates corresponding to the common search space size corresponding to the aggregation level 24 is 1; and the terminal-specific search space size corresponding to the aggregation level 24 is 24, and the Number of PDCCH candidates corresponding to the terminal-specific search space size corresponding to the aggregation level 24 is 1.

Optionally, the aggregation levels supported by the terminal includes the aggregation levels 16 and 24;

the predefined search space includes common search space sizes and terminal-specific search space sizes that correspond to the aggregation levels 16 and 24, PDCCH candidate quantities corresponding to the common search space sizes corresponding to the aggregation levels 16 and 24, and PDCCH candidate quantities corresponding to the terminal-specific search space sizes corresponding to the aggregation levels 16 and 24;

the common search space size corresponding to the aggregation level 16 is 16, and the Number of PDCCH candidates corresponding to the common search space size corresponding to the aggregation level 16 is 1;

the terminal-specific search space size corresponding to the aggregation level 16 is 32, and the Number of PDCCH candidates corresponding to the terminal-specific search space size corresponding to the aggregation level 16 is 2;

the common search space size corresponding to the aggregation level 24 is 24, and the Number of PDCCH candidates corresponding to the common search space size corresponding to the aggregation level 24 is 1; and the terminal-specific search space size corresponding to the aggregation level 24 is 48, and the Number of PDCCH candidates corresponding to the terminal-specific search space size corresponding to the aggregation level 24 is 2.

Optionally, the terminal further includes:

a sending module, configured to report, to a base station, at least one aggregation level supported by the terminal, where the DCI is carried on a physical resource corresponding to an aggregation level N in the at least one aggregation level.

Optionally, the determining module is further configured to:

obtain a broadcast message of the base station, and determine, based on the broadcast message, aggregation levels supported by a cell in which the terminal is located; and the sending module is configured to:

search the aggregation levels supported by the cell for the aggregation levels supported by the terminal, select the at least one aggregation level from the aggregation levels supported by the terminal, and report the selected at least one aggregation level to the base station.

According to a seventh aspect, a terminal is provided, and the terminal may include:

a determining module, configured to determine blind detection search space of the terminal from predefined search space based on a quantity of resource blocks RB occupied by an enhanced physical downlink control channel EPDCCH and aggregation levels supported by the terminal, where the predefined search space includes search space corresponding to an RB quantity 16; and a searching module, configured to perform blind detection in the blind detection search space determined by the determining module to obtain downlink control information DCI.

Optionally, the predefined search space includes data shown in any one of Table 1 to Table 15.

Optionally, the predefined search space further includes search space corresponding to an RB quantity 32, and a corresponding aggregation level obtained when the RB quantity is 32 includes 128.

According to an eighth aspect, a terminal is provided, and the terminal may include:

a sending module, configured to report, to a base station, at least one aggregation level supported by the terminal, where the at least one aggregation level includes an aggregation level N;

a searching module, configured to perform, based on each of the at least one aggregation level reported by the sending module, blind detection on downlink control information DCI delivered by the base station; and a merging module, configured to merge frequency-domain data of two pieces of same DCI carried on two physical downlink control channel PDCCH physical resources when blind detection performed by the searching module on the two pieces of same DCI based on the aggregation level N fails, where the searching module is further configured to perform, based on the aggregation level N, blind detection on a result of merging the frequency-domain data by the merging module, to obtain the DCI delivered by the base station.

Optionally, the sending module is further configured to:

report, to the base station, a message indicating that the terminal has a frequency-domain data merging capability, where the message is provided for the base station to determine whether to repeatedly send the DCI for the terminal on the two PDCCH physical resources corresponding to the aggregation level N.

According to a ninth aspect, a base station is provided, and the base station may include:

a receiving module, configured to receive at least one aggregation level that is reported by a terminal and that is supported by the terminal, where the at least one aggregation level includes an aggregation level N;

a processing module, configured to split downlink control information DCI used to control the terminal into first DCI and second DCI; and a sending module, configured to send the first DCI and the second DCI obtained after processing by the processing module to the terminal, where the first DCI and the second DCI are separately carried on two different physical downlink control channel PDCCH physical resources corresponding to the aggregation level N, and the first DCI and the second DCI are used by the terminal to perform joint parsing, where N is a natural number.

Optionally, the receiving module is further configured to: receive a message reported by the terminal, and determine, based on the message, that the terminal has a frequency-domain data merging capability.

Optionally, the processing module is further configured to:

obtain a preamble of a physical random access channel of the terminal, and determine, based on the preamble, that the terminal has the frequency-domain data merging capability.

According to a tenth aspect, a terminal is provided, and the terminal may include:

a sending module, configured to report, to a base station, at least one aggregation level supported by the terminal, where the at least one aggregation level includes an aggregation level N;

a searching module, configured to perform, based on each of the at least one aggregation level, blind detection on downlink control information DCI delivered by the base station; and a processing module, configured to jointly assemble first DCI and second DCI that are carried on two physical downlink control channel PDCCH physical resources if blind detection performed by the searching module on the first DCI and the second DCI based on the aggregation level N succeeds, to obtain the DCI delivered by the base station.

Optionally, the sending module is further configured to:

report, to the base station, a message indicating that the terminal has a frequency-domain data merging capability.

According to an eleventh aspect, a terminal is provided, and the terminal may include a memory, a processor, and a transceiver, where the memory is configured to store a group of program code; and the processor and the transceiver are configured to invoke the program code stored in the memory to perform the methods according to the first aspect, the second aspect, the third aspect, and the fifth aspect.

According to a twelfth aspect, a base station is provided, and the base station may include a memory, a processor, and a transceiver, where the memory is configured to store a group of program code; and the processor and the transceiver are configured to invoke the program code stored in the memory to perform the method according to the fourth aspect.

In this application, aggregation levels supported by a cell and the aggregation levels supported by the terminal may be extended to the aggregation level 16 or 24, and the base station may adapt the DCI to be delivered to the UE to a larger physical resource. If an information bit does not change, a PDCCH transmission bit rate is reduced to obtain a PDCCH coverage gain. Therefore, a downlink coverage gain can be increased, diversity of implementations of downlink coverage enhancement can be improved, and applicability is higher. Further, in this application, an EPDCCH candidate user set for detection may be extended, and the quantity of RBs occupied by the EPDCCH and the aggregation levels supported by the UE may be extended, so that the EPDCCH candidate user set may be extended, and a channel coverage area of the EPDCCH may be extended, thereby increasing a channel coverage gain of the EPDCCH.

DESCRIPTION OF DRAWINGS

To describe the technical solutions in this application more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
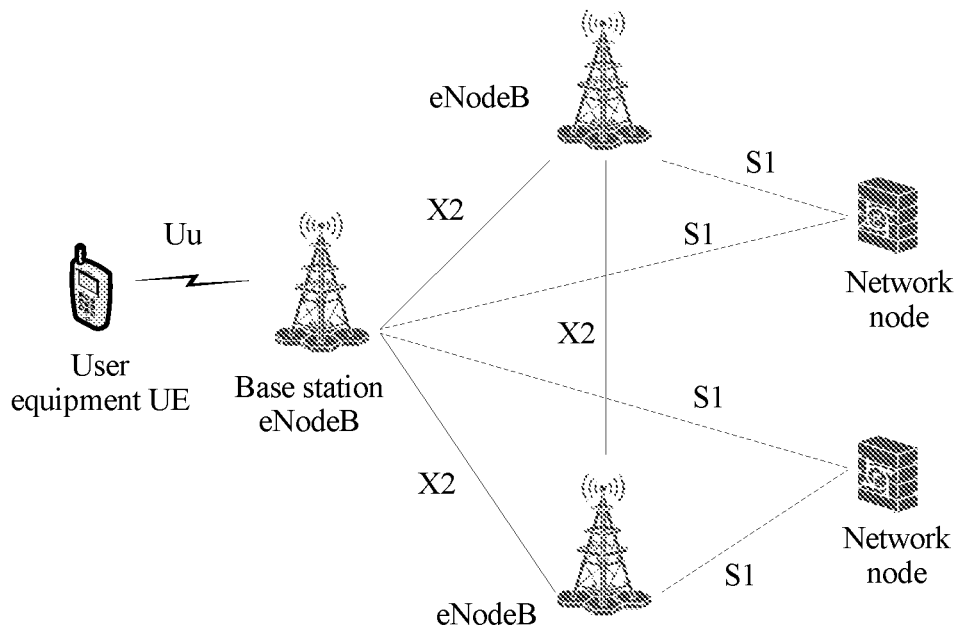
FIG. 1 is a schematic architectural diagram of an LTE communications system according to this application.

A downlink control information processing method provided in this application is applicable to an LTE communications system. FIG. 1 is a schematic architectural diagram of an LTE communications system according to this application. The LTE system provided in this application includes a terminal (namely, a user equipment (UE)), a base station (eNodeB), a network node, and the like. The network node may include a mobility management entity (MME), a serving gateway (S-GW), or the like. In specific implementation, the UE and the base station may exchange data through a Uu interface, base stations may exchange data through an X2 interface, and the base station and the network node may exchange data through an S1 interface. It should be noted that a connection manner in which the UE, the base station, and the network node exchange data is merely an example, and may be specifically determined based on an actual application scenario. This is not limited herein. Data transmission included in an implementation provided in this application is mainly data transmission between the base station and the UE. The base station may send downlink data to the UE, and the UE may receive the data delivered by the base station or send uplink data to the base station. The following describes the downlink control information processing method and apparatus provided in this application with reference to FIG. 2 to FIG. 15.

Figure 2:
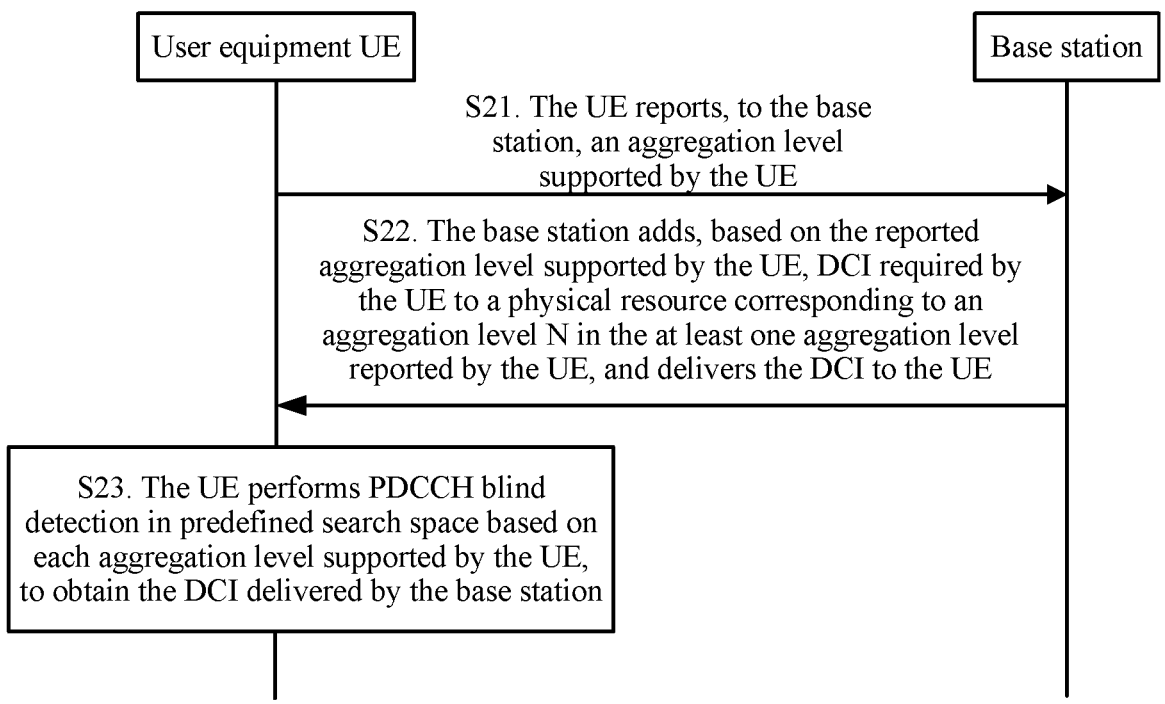
FIG. 2 is a schematic flowchart of a downlink control information processing method according to this application.

FIG. 2 is a schematic flowchart of a downlink control information processing method according to this application. The method provided in this application includes the following steps.

S21. UE reports, to a base station, aggregation levels supported by the UE.

In some feasible implementations, a physical downlink control channel (PDCCH) channel may be extended in this application, and a control channel element (CCE) aggregation level is extended to 16 or 24. The CCE aggregation level (referred to as an aggregation level for short below) supported by the UE may be extended from original 1, 2, 4, and 8 to 1, 2, 4, 8, and 16, or 1, 2, 4, 8, and 24, or 1, 2, 4, 8, 16, and 24. In an existing implementation, the UE supports four aggregation levels (namely, aggregation levels 1, 2, 4, and 8). In this application, the UE may support five aggregation levels (namely, one more than those in the existing implementation, for example, 16 or 24) or six aggregation levels (namely, two more than those in the existing implementation, for example, 16 and 24).

In some feasible implementations, the UE may determine, based on a channel condition at a location (namely, a cell in which the UE is located) of the UE, one or more aggregation levels supported by the UE at the current location. The one or more aggregation levels may be one or more of five aggregation levels supported by the UE, or may be one or more of six aggregation levels supported by the UE. For example, if the UE can support six aggregation levels such as 1, 2, 4, 8, 16, and 24 under an ideal channel condition, the aggregation levels supported by the UE may include three aggregation levels such as 2, 8, and 16 or 1, 4, and 24 under the channel condition at the current location of the UE. The UE may report, to the base station, the one or more aggregation levels supported by the UE under the channel condition at the current location, or report, to the base station, one or more aggregation levels that are not supported by the UE under the channel condition at the current location.

In some feasible implementations, the base station may broadcast aggregation levels supported by a cell in which the UE is located. After obtaining a broadcast message of the base station, the UE may determine, based on the broadcast message, the aggregation levels supported by the cell in which the UE is located. Further, the UE may select, based on a PDCCH blind detection capability of the UE, the aggregation levels supported by the UE from a plurality of aggregation levels supported by the cell, and then may select one or more of the aggregation levels supported by the UE to report the one or more aggregation levels to the base station. For example, the aggregation level that is broadcast by the base station and that is supported by the cell includes six aggregation levels such as 1, 2, 4, 8, 16, and 24. The PDCCH blind detection capability of the UE specifies that the aggregation levels supported by the UE includes five aggregation levels such as 1, 4, 8, 16, and 24. After determining the aggregation levels supported by the cell, the UE may search the aggregation levels supported by the cell for the aggregation level (namely, 1, 4, 8, 16, and 24) supported by the UE, and select one or more (such as 4, 16, and 24) of the aggregation levels supported by the UE to report the one or more aggregation levels to the base station.

In specific implementation, the base station may record, by using different search space lists, search space (namely, predefined search space) corresponding to each aggregation level supported by the cell in different scenarios. For example, when the aggregation levels supported by the cell includes 1, 2, 4, 8, and 16, search space corresponding to all aggregation levels may be recorded by using a search space list. The base station may broadcast an index (such as Tab #1) of the search space list, and the UE may search for the search space list based on the index, and then may determine the aggregation levels supported by the cell in which the UE is located. Table 1 is a schematic table of a search space list.

TABLE 1

| | Search space $S_k^{(L)}$ | | Number of PDCCH |
|---|---|---|---|
| Search space type (Type) | Aggregation level (Aggregation level) L | Search space size (Size) [in CCEs] | candidates (Number of PDCCH candidates) $M^{(L)}$ |
| UE-specific search space (UE-specific) | 1 | 6 | 6 |
| | 2 | 12 | 6 |
| | 4 | 8 | 2 |
| | 8 | 16 | 2 |
| | 16 | 16 | 1 |
| Common search space (Common) | 4 | 16 | 4 |
| | 8 | 16 | 2 |
| | 16 | 16 | 1 |

In Table 1, the aggregation levels supported by the cell may be extended to the aggregation level 16. A common search space size corresponding to the aggregation level 16 is 16, and a Number of PDCCH candidates corresponding to the common search space size is 1. A UE-specific search space size corresponding to the aggregation level 16 is 16, and a Number of PDCCH candidates corresponding to the UE-specific search space size is 1. It should be noted that, in this application, the common search space size and the specific search space size refer to quantities of CCEs. For example, if a common search space size is 16, it indicates that the common search space is 16 CCEs. If specific search space size is 16, it indicates that the specific search space is 16 CCEs. Details are not described below.

When the aggregation levels supported by the cell includes 1, 2, 4, 8, and 24, search space corresponding to all aggregation levels may be recorded by using another search space list. The base station may broadcast an index (such as Tab #2) of the search space list, and the UE may search for the search space list based on the index, and then may determine the aggregation levels supported by the cell in which the UE is located. Table 2 is another schematic table of a search space list.

TABLE 2

| | Search space $S_k^{(L)}$ | | Number of PDCCH |
|---|---|---|---|
| Search space type (Type) | Aggregation level (Aggregation level) L | Search space size (Size) [in CCEs] | candidates (Number of PDCCH candidates) $M^{(L)}$ |
| UE-specific search space | 1 | 6 | 6 |
| | 2 | 12 | 6 |

TABLE 2-continued

| | Search space $S_k^{(L)}$ | | Number of PDCCH |
|---|---|---|---|
| Search space type (Type) | Aggregation level (Aggregation level) L | Search space size (Size) [in CCEs] | candidates (Number of PDCCH candidates) $M^{(L)}$ |
| (UE-specific) | 4 | 8 | 2 |
| | 8 | 16 | 2 |
| | 24 | 24 | 1 |
| Common search space (Common) | 4 | 16 | 4 |
| | 8 | 16 | 2 |
| | 24 | 24 | 1 |

In Table 2, the aggregation levels supported by the cell may be extended to the aggregation level 24. A common search space size corresponding to the aggregation level 24 is 24, and a Number of PDCCH candidates corresponding to the common search space size is 1. A UE-specific search space size corresponding to the aggregation level 24 is 24, and a Number of PDCCH candidates corresponding to the UE-specific search space size is 1.

When the aggregation levels supported by the cell includes 1, 2, 4, 8, 16, and 24, search space corresponding to all aggregation levels may be recorded by using another search space list. The base station may broadcast an index (such as Tab #3) of the search space list, and the UE may search for the search space list based on the index, and then may determine the aggregation levels supported by the cell in which the UE is located. Table 3 is another schematic table of a search space list.

TABLE 3

| | Search space $S_k^{(L)}$ | | Number of PDCCH |
|---|---|---|---|
| Search space type (Type) | Aggregation level (Aggregation level) L | Search space size (Size) [in CCEs] | candidates (Number of PDCCH candidates) $M^{(L)}$ |
| UE-specific search space (UE-specific) | 1 | 6 | 6 |
| | 2 | 12 | 6 |
| | 4 | 8 | 2 |
| | 8 | 16 | 2 |
| | 16 | 16 | 1 |
| | 24 | 24 | 1 |
| Common search space (Common) | 4 | 16 | 4 |
| | 8 | 16 | 2 |
| | 16 | 16 | 1 |
| | 24 | 24 | 1 |

In Table 3, the aggregation levels supported by the cell may be extended to the aggregation levels 16 and 24. A common search space size corresponding to the aggregation level 16 is 16, and a Number of PDCCH candidates corresponding to the common search space size is 1. A UE-specific search space size corresponding to the aggregation level 16 is 16, and a Number of PDCCH candidates corresponding to the UE-specific search space size is 1. A common search space size corresponding to the aggregation level 24 is 24, and a Number of PDCCH candidates corresponding to the common search space size is 1. A UE-specific search space size corresponding to the aggregation level 24 is 24, and a Number of PDCCH candidates corresponding to the UE-specific search space size is 1.

Further, when the aggregation levels supported by the cell includes 1, 2, 4, 8, 16, and 24, search space corresponding to all aggregation levels may be recorded by using another search space list. The base station may broadcast an index (such as Tab #4) of the search space list, and the UE may search for the search space list based on the index, and then may determine the aggregation levels supported by the cell in which the UE is located. Table 4 is another schematic table of a search space list.

TABLE 4

| | Search space $S_k^{(L)}$ | | Number of PDCCH |
|---|---|---|---|
| Search space type (Type) | Aggregation level (Aggregation level) L | Search space size (Size) [in CCEs] | candidates (Number of PDCCH candidates) $M^{(L)}$ |
| UE-specific search space (UE-specific) | 1 | 6 | 6 |
| | 2 | 12 | 6 |
| | 4 | 8 | 2 |
| | 8 | 16 | 2 |
| | 16 | 16 | 2 |
| | 24 | 24 | 2 |
| Common search space (Common) | 4 | 16 | 4 |
| | 8 | 16 | 2 |
| | 16 | 16 | 1 |
| | 24 | 24 | 1 |

In Table 4, the aggregation levels supported by the cell may be extended to the aggregation levels 16 and 24. A common search space size corresponding to the aggregation level 16 is 16, and a Number of PDCCH candidates corresponding to the common search space size is 1. A UE-specific search space size corresponding to the aggregation level 16 is 16, and a Number of PDCCH candidates corresponding to the UE-specific search space size is 2. A common search space size corresponding to the aggregation level 24 is 24, and a Number of PDCCH candidates corresponding to the common search space size is 1. A UE-specific search space size corresponding to the aggregation level 24 is 24, and a Number of PDCCH candidates corresponding to the UE-specific search space size is 2.

In specific implementation, after finding a corresponding search space list based on a search space list index broadcast by the base station, the UE may determine, based on information recorded in the search space list, the aggregation levels supported by the cell, then select the aggregation levels supported by the UE from the aggregation levels supported by the cell, and select one or more of the aggregation levels supported by the UE to report the one or more aggregation levels to the base station. For blind detection of the UE, the UE needs to perform blind detection only at the aggregation levels supported by the UE, and does not perform blind detection at an aggregation level that is not supported by the UE. This can reduce processing complexity of blind detection, and improve DCI processing efficiency.

S22. The base station adds, based on the aggregation level reported by the UE, DCI required by the UE to a physical resource corresponding to an aggregation level N in the at least one aggregation level reported by the UE, and delivers the DCI to the UE.

In some feasible implementations, after the UE reports, to the base station, the aggregation levels supported by the UE, the base station may add, based on the aggregation level reported by the UE, the DCI required by the UE to a physical resource corresponding to an aggregation level (such as the aggregation level N) in a plurality of aggregation levels reported by the UE, and deliver the DCI to the UE by using the physical resource. In other words, in this application, the aggregation levels supported by the UE may be extended to the aggregation level 16 or 24, and the base station may adapt the DCI to be delivered to the UE to a larger physical resource. If an information bit does not change, a PDCCH transmission bit rate is reduced to obtain a PDCCH coverage gain.

It should be noted that, in this application, when delivering the DCI to the UE, the base station no longer directly determines, based on the aggregation levels supported by the cell, an aggregation level corresponding to the physical resource used to carry the DCI, but selects an aggregation level from the aggregation level reported by the UE, adds the information to be delivered to the UE to a physical resource corresponding to the aggregation level, and delivers the DCI to the UE. Therefore, an operation is more flexible, association is stronger, and applicability is higher.

S23. The UE performs PDCCH blind detection in predefined search space based on each aggregation level supported by the UE, to obtain the DCI delivered by the base station.

In some feasible implementations, after the UE reports, to the base station, one or more of the aggregation levels supported by the UE, when the UE performs PDCCH blind detection, the UE only needs to perform blind detection in search space corresponding to each aggregation level reported by the UE, and does not need to perform blind detection in search space corresponding to all aggregation levels supported by the cell or all aggregation levels supported by the UE. This reduces DCI processing complexity, and can improve DCI processing efficiency. The predefined search space is search space sizes, PDCCH candidate quantities, and the like corresponding to all aggregation levels included in any list in Table 1 to Table 4.

In specific implementation, in different application scenarios, the UE may determine a corresponding search space list from Table 1 to Table 4 based on the aggregation level reported by the UE, determine, based on predefined search space included in each search space list, search space in which the UE needs to perform blind detection, and then may perform PDCCH blind detection in the determined search space. The UE obtains, through blind detection, the DCI carried on a physical resource corresponding to an aggregation level (such as the aggregation level N).

In this application, the aggregation levels supported by the cell and the aggregation levels supported by the UE may be extended to the aggregation level 16 or 24, and the base station may adapt the DCI to be delivered to the UE to a larger physical resource. If an information bit does not change, a PDCCH transmission bit rate is reduced to obtain a PDCCH coverage gain. When delivering the DCI to the UE, the base station no longer directly determines, based on the aggregation levels supported by the cell, an aggregation level corresponding to the physical resource used to carry the DCI, but selects an aggregation level from the aggregation level reported by the UE, adds the to-be-delivered DCI to a physical resource corresponding to the aggregation level, and delivers the DCI to the UE. Therefore, an operation is more flexible, association is stronger, and applicability is higher. When performing PDCCH blind detection, the UE only needs to perform blind detection in search space corresponding to each aggregation level reported by the UE, and does not need to perform blind detection in search space corresponding to all aggregation levels supported by the cell or all aggregation levels supported by the UE. This reduces DCI processing complexity, and can improve DCI processing efficiency.

Figure 3:
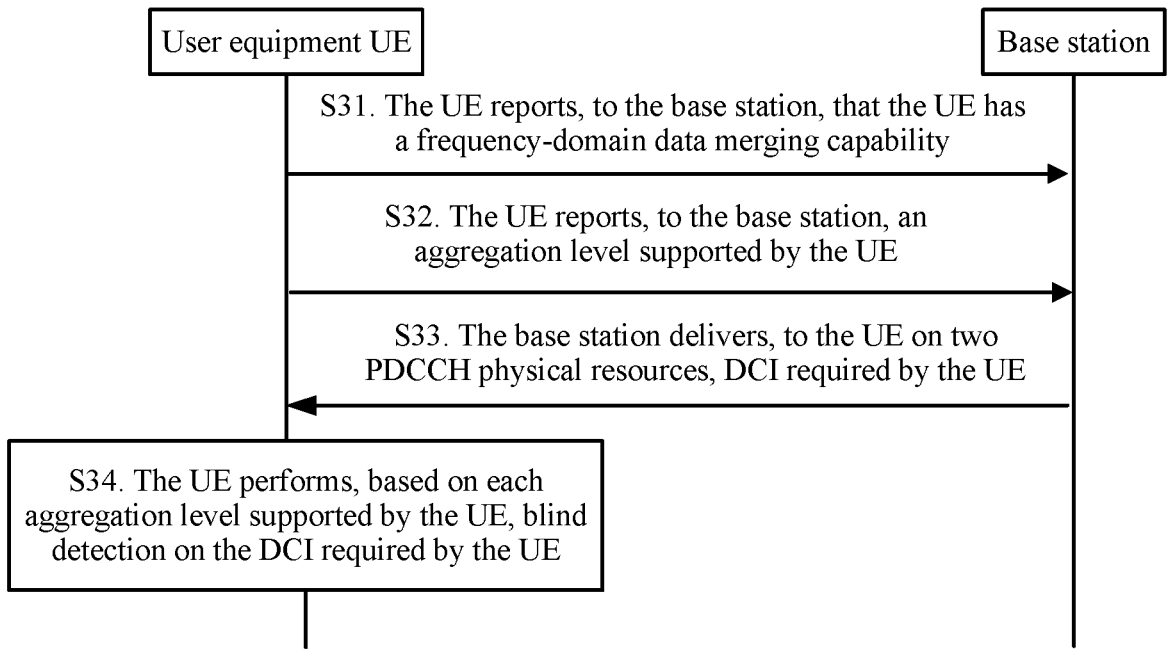
FIG. 3 is another schematic flowchart of a downlink control information processing method according to this application.

FIG. 3 is another schematic flowchart of a downlink control information processing method according to this application. The method provided in this application includes the following steps.

S31. UE reports, to a base station, that the UE has a frequency-domain data merging capability.

In some feasible implementations, when accessing a cell network at any time, the UE may send, to the base station, a message indicating that the UE has the frequency-domain data merging capability, in other words, the UE supports frequency-domain data merging. The base station may determine, based on the message reported by the UE, that the UE supports frequency-domain data merging. Then, when delivering DCI required by the UE, the base station may determine whether to repeatedly send the DCI required by the UE on two PDCCH physical resources.

Further, in some feasible implementations, the base station may determine, based on a preamble of a physical random access channel (PRACH) of the UE, that the UE has the frequency-domain data merging capability. The preamble is an enhanced preamble (namely, an enhanced preamble). In this application, the enhanced preamble is different from a preamble defined in LTE, and the enhanced preamble includes the following two features:

1. A quantity of preamble user sets is extended, and an "enhancement coverage user set" is obtained through classification.

Usually, an existing protocol specifies that a preamble needs to support only 64 users. In this application, a quantity of users whom a preamble needs to support may be extended to 72, where 0 to 63 are defined as a "normal coverage user set", which is used to support 64 users, and 64 to 71 are defined as an "enhancement coverage user set", which is used to support eight users.

2. A preamble for an enhancement coverage user is generated based on a root index designated by a cell.

In some feasible implementations, the root index designated by the cell is a root index designated to an enhancement user for use, and a common user cannot use the root index. The base station identifies the enhancement user by detecting the preamble generated based on the root index designated by the cell, so as to differentiate between the common user and the enhancement user. If the base station detects the enhancement user, the base station may determine that a current scenario is a scenario in which enhancement is required, and then may determine a manner of delivering the DCI required by the UE. Specifically, the base station may determine, based on the detected preamble, that the UE supports frequency-domain data merging. Then, when delivering the DCI required by the UE, the base station may determine whether to repeatedly send the DCI required by the UE on the two PDCCH physical resources.

S32. The UE reports, to the base station, aggregation levels supported by the UE.

In some feasible implementations, the UE may report, to the base station, the aggregation levels supported by the UE. In specific implementation, a sequence in which the UE reports, to the base station, the aggregation levels supported by the UE, or reports, to the base station, that the UE has the frequency-domain data merging capability may be determined based on an actual application scenario. This is not limited herein. The aggregation level reported by the UE to the base station may be all aggregation levels supported by the UE, or may be some of all aggregation levels supported by the UE. This may be specifically determined based on an actual application scenario, and is not limited herein.

S33. The base station delivers, to the UE on two PDCCH physical resources, DCI required by the UE.

Figure 4:
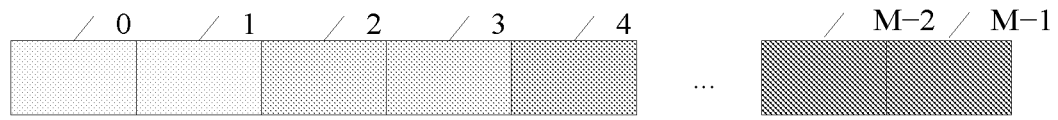
FIG. 4 is a pattern of frequency-domain data merging according to this application.

In some feasible implementations, after determining that the UE has the frequency-domain data merging capability, the base station may separately add the DCI required by the UE to the two PDCCH physical resources for delivering. Further, the base station may determine, based on the aggregation levels supported by the UE, the two physical resources used to carry the DCI required by the UE. Specifically, the base station may select an aggregation level (such as an aggregation level 8) from the aggregation levels supported by the UE, separately add the DCI required by the UE to two different PDCCH physical resources corresponding to the aggregation level 8, and deliver the DCI to the UE. FIG. 4 is a pattern of frequency-domain data merging according to this application. For example, it is assumed that the base station selects the aggregation level 8 from the aggregation levels supported by the UE, and determines a PDCCH physical resource corresponding to the aggregation level 8 as a physical resource used to carry the DCI required by the UE. A digital index shown in FIG. 4 is a location (including UE-specific and common) of a candidate resource corresponding to the aggregation level 8, and a total quantity of locations of candidate resources is M. Candidate resources with a same background color may be merged. For example, two candidate resources at candidate resource locations 0 and 1 may be merged, and two candidate resources at candidate resource locations M-2 and M-1 may also be merged. When determining that the DCI required by the UE needs to be delivered on different PDCCH physical resources, the base station may determine, by calculating a start location of a candidate resource, candidate resources corresponding to digital indexes n and n+1 as the physical resources used to carry the DCI required by the UE in a case in which the candidate resource can be allocated, where n+1≤M-1, and n is an even number.

It should be noted that the base station sets the physical resources used to carry the DCI required by the UE to locations of the candidate resources corresponding to the digital indexes n and n+1, and limits values of n and n+1, so that locations of the physical resources used to carry the DCI required by the UE can be restrained, and it is ensured that the UE is aligned with the base station, thereby reducing data processing complexity.

S34. The UE performs, based on each aggregation level supported by the UE, blind detection on the DCI required by the UE.

In some feasible implementations, after reporting, to the base station, the aggregation levels supported by the UE, the UE may perform, based on each of the reported aggregation level, blind detection on the DCI required by the UE on a physical resource corresponding to each aggregation level. If blind detection performed by the UE based on a highest aggregation level (such as the aggregation level 8) fails, and the terminal has reported that "the frequency-domain data merging capability", the UE needs to perform merging according to a merging pattern, and perform blind detection on merged data based on the highest aggregation level. The frequency-domain data merging may include symbol-level data merging and bit-level data merging.

Figure 5:
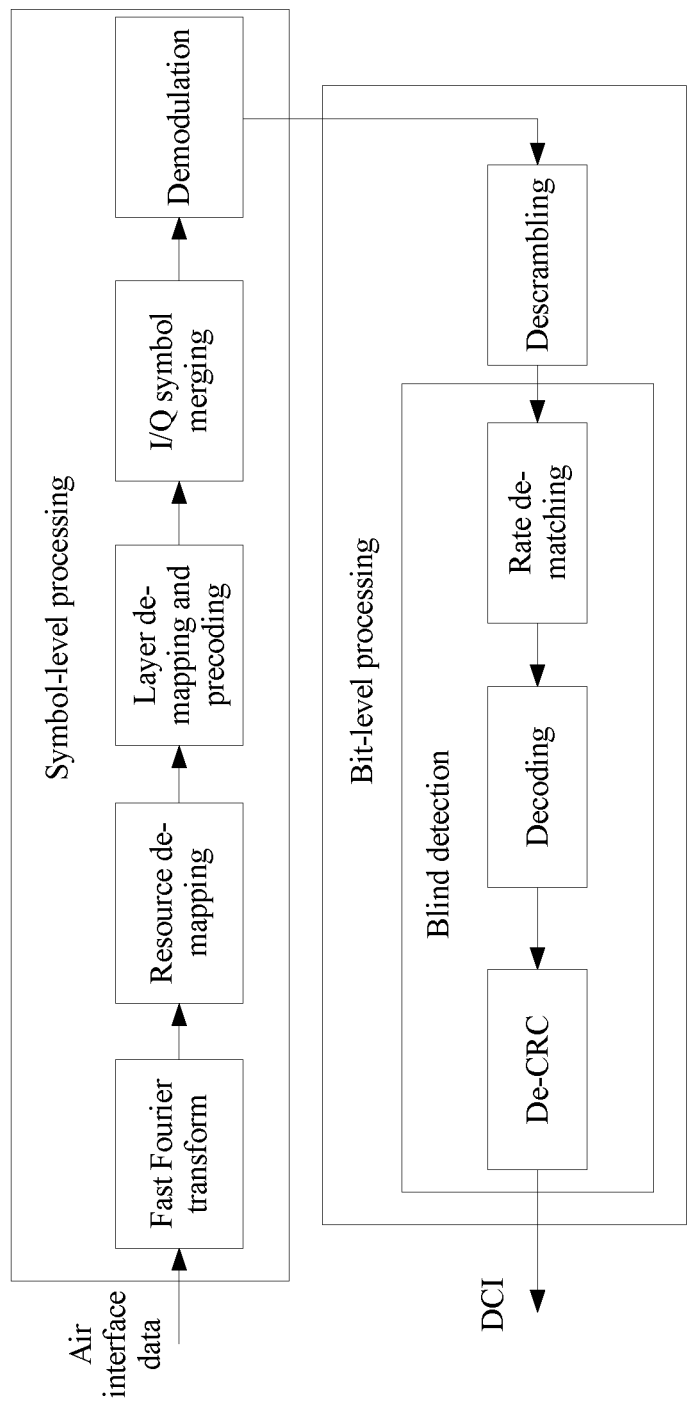
FIG. 5 is a schematic diagram of frequency-domain data merging according to this application.

In some feasible implementations, the UE may perform in-phase/quadrature (I/Q) symbol merging on two pieces of same DCI carried on two PDCCH physical resources. FIG. 5 is a schematic diagram of frequency-domain data merging according to this application. In a symbol-level data merging processing process, after performing layer-demapping and precoding on the two pieces of same DCI, the UE may perform I/Q symbol merging and demodulation on data obtained after precoding, and then may perform operations such as data descrambling and blind detection.

Figure 6:
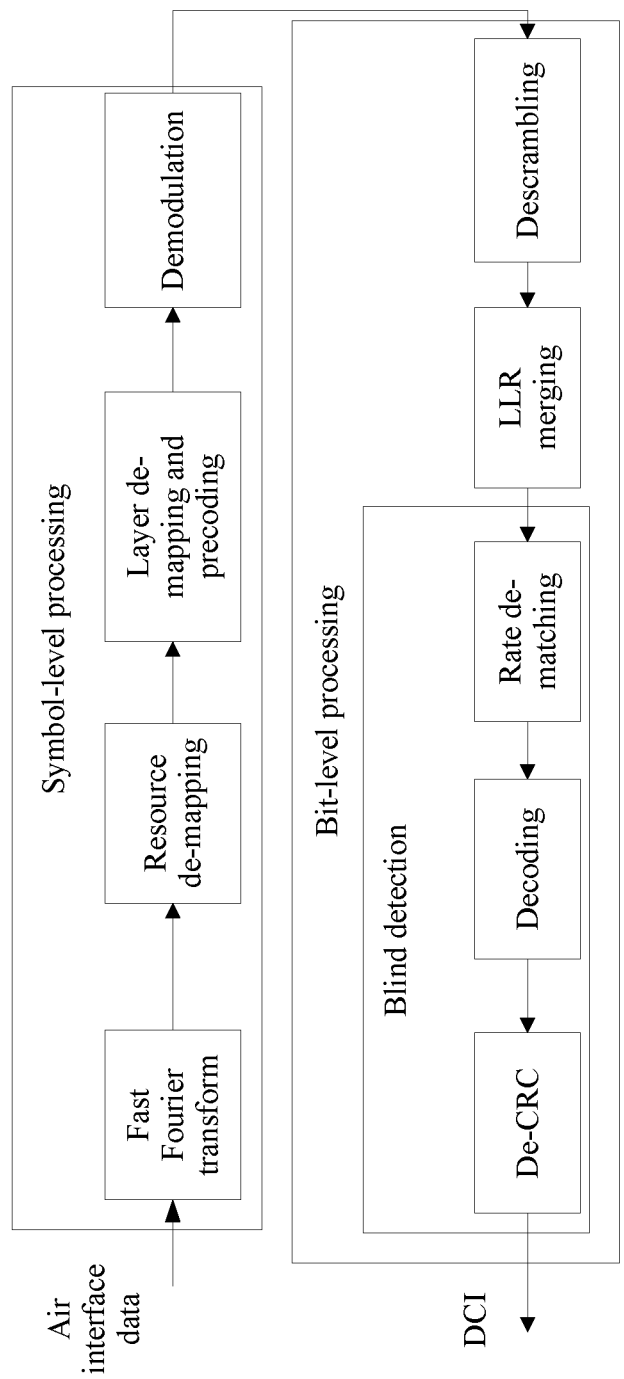
FIG. 6 is another schematic diagram of frequency-domain data merging according to this application.

In some feasible implementations, the UE may alternatively perform log-likelihood ratio (LLR) merging (or referred to as soft value merging or soft bit merging) on two pieces of same DCI carried on two PDCCH physical resources. FIG. 6 is another schematic diagram of frequency-domain data merging according to this application. In a bit-level data merging processing process, after descrambling frequency-domain data, the UE may perform processing operations, for example, LLR merging and bit-level blind detection such as rate de-matching, on data obtained after descrambling.

In some feasible implementations, after merging frequency-domain data, the UE performs blind detection on the merged data. In specific implementation, if the UE performs frequency-domain data merging and performs blind detection on merged DCI at the aggregation level 8, blind detection performed by the UE on the merged DCI may be equivalent to blind detection on information carried on a physical resource corresponding to an aggregation level 16, so that channel coverage of a PDCCH is improved, and a channel coverage gain is obtained.

In this application, the base station may deliver, on the two different PDCCH physical resources at a same TTI, the DCI required by the UE, in other words, the base station may repeatedly deliver, twice at a same TTI, the DCI required by the UE. A higher coverage gain is obtained through frequency-domain data merging, an operation is simpler, and applicability is higher.

Figure 7:
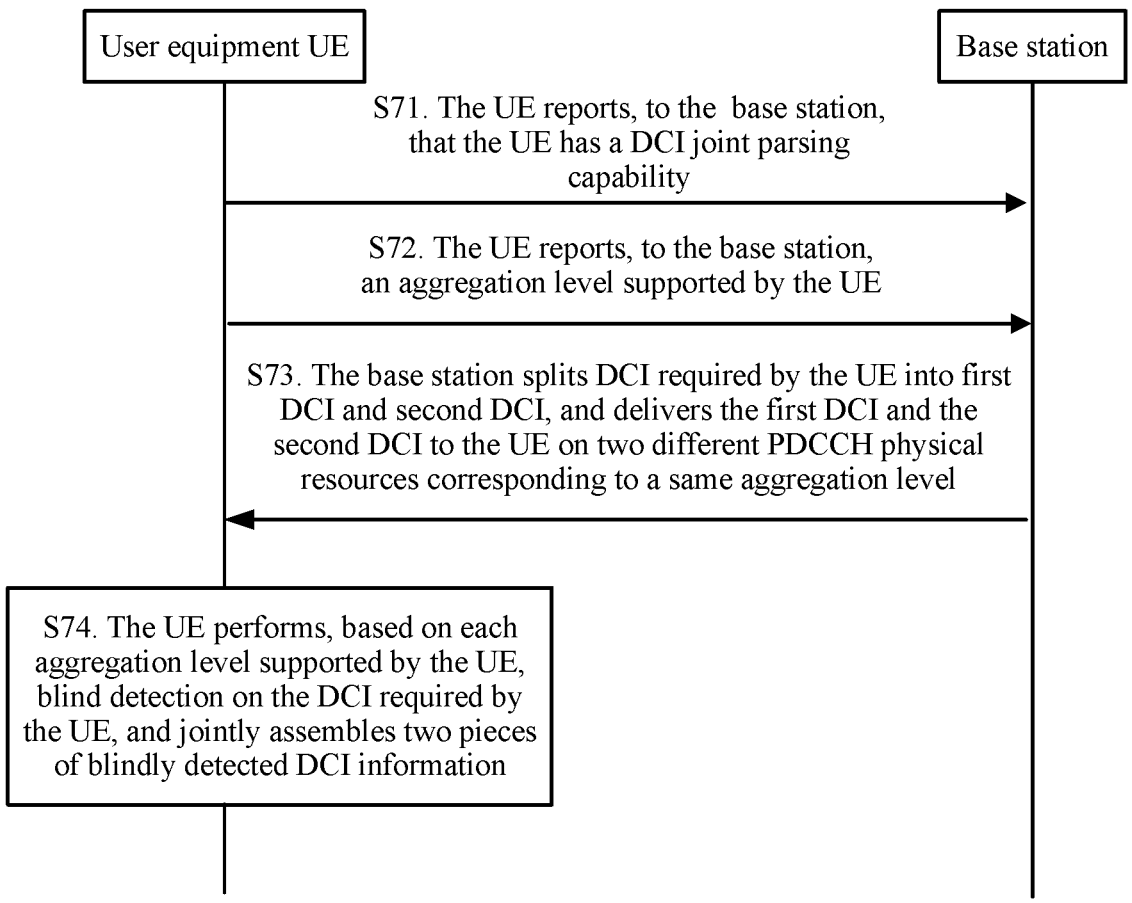
FIG. 7 is another schematic flowchart of a downlink control information processing method according to this application.

FIG. 7 is another schematic flowchart of a downlink control information processing method according to this application. The method provided in this application includes the following steps.

S71. UE reports, to a base station, that the UE has a DCI joint parsing capability.

In some feasible implementations, for an implementation in which the UE reports, to the base station, that the UE has the DCI joint parsing capability, refer to step S31 in the foregoing embodiment. Details are not described herein again.

S72. The UE reports, to the base station, aggregation levels supported by the UE.

In some feasible implementations, for an implementation in which the UE reports, to the base station, the aggregation levels supported by the UE, refer to step S32 in the foregoing embodiment. Details are not described herein again.

S73. The base station splits DCI required by the UE into first DCI and second DCI, and delivers the first DCI and the second DCI to the UE on two different PDCCH physical resources corresponding to a same aggregation level.

In some feasible implementations, after the base station determines that the UE has the DCI joint parsing capability, if the base station directly delivers the DCI required by the UE to the UE, but receives no feedback from the UE at a moment at which a feedback is expected to be received, the base station may determine that the UE cannot correctly parse the DCI when the complete DCI is directly delivered to the UE. In this case, the base station may split the DCI required by the UE into two pieces of DCI, including the first DCI and the second DCI. Further, the base station may separately add the first DCI and the second DCI obtained through splitting to the two physical resources, to separately deliver the first DCI and the second DCI to the UE. The two physical resources correspond to the same aggregation level (such as an aggregation level 8). Therefore, a transmission bit rate is reduced, and then a coverage gain can be obtained by reducing the transmission bit rate.

S74. The UE performs, based on each aggregation level supported by the UE, blind detection on the DCI required by the UE, and jointly assembles two pieces of blindly detected DCI.

Figure 8:
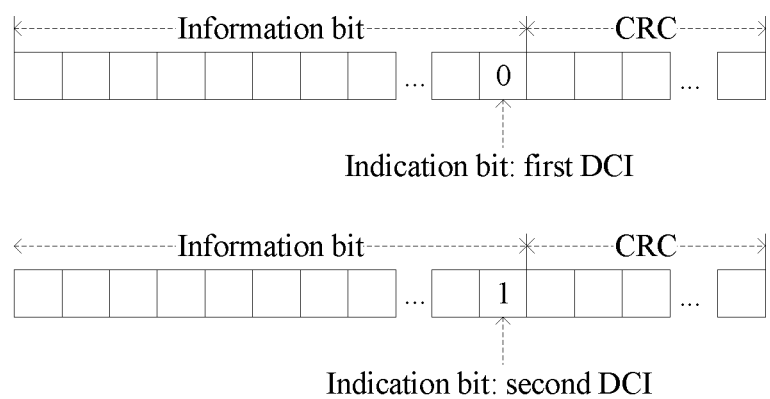
FIG. 8 is a schematic diagram of DCI joint assembling according to this application.

In some feasible implementations, if the UE performs blind detection on a physical resource corresponding to each aggregation level, and blind detection performed on two physical resources corresponding to a same aggregation level (such as the aggregation level 8) succeeds, the UE may jointly assemble two pieces of successfully blindly detected DCI (namely, the first DCI and the second DCI) that have a same format, to obtain the DCI required by the UE. FIG. 8 is a schematic diagram of DCI joint assembling according to this application. When jointly assembling the two pieces of DCI, the UE may separately extract information bits of the first DCI and the second DCI, remove indication bits, and perform joint assembling to generate complete DCI.

In this application, the base station allocates two candidate physical resources (namely, candidate CCE resources) corresponding to the aggregation level 8 to the to-be-transmitted DCI. In other words, information bits carried on each candidate user CCE resource corresponding to the aggregation level 8 are halved. In essence, a transmission bit rate is reduced. A coverage gain is obtained from reducing the bit rate, so that diversity of implementations of coverage enhancement is improved, and applicability is higher.

It should be noted that, for data transmission on an enhanced physical downlink control channel (EPDCCH), to implement enhanced coverage of the EPDCCH, an enhanced control channel element (ECCE) that needs to be occupied for EPDCCH transmission is also extended in this application, so as to improve flexibility of a DCI processing manner, improve applicability of a DCI processing method, and increase a coverage gain of the EPDCCH.

In an LTE system, a cyclic prefix (CP) includes a normal cyclic prefix (Normal CP) and an extended cyclic prefix (Extended CP), and a data transmission subframe includes a normal subframe and a special subframe. Therefore, the two forms of cyclic prefixes and the two forms of data transmission subframes may be combined to obtain four types of data transmission manners:

1. Normal CP & Normal subframe;
2. Normal CP & Special subframe;
3. Extended CP & Normal subframe; and
4. Extended CP & Special subframe.

The four types of data transmission manners may be classified in two classification manners. Specifically, the four types of data transmission manners may be classified into Case A and Case B, or Case 1, Case 2, and Case 3.

A specific classification result is as follows:

1. Normal CP & Normal subframe are classified into Case A;
2. Normal CP & Special subframe are classified into Case B;
3. Extended CP & Normal subframe are classified into Case B; and
4. Extended CP & Special subframe are classified into Case B; or 1. Normal CP & Normal subframe are classified into Case 1;
2. Normal CP & Special subframe are classified into Case 3;
3. Extended CP & Normal subframe are classified into Case 2; and
4. Extended CP & Special subframe are classified into Case 3.

In an EPDCCH data transmission process, data transmission manners in different cases correspond to different search space.

In LTE, a quantity of ECCEs for transmission on an EPDCCH depends on an EPDCCH format. Therefore, quantities of ECCEs occupied for EPDCCH transmission corresponding to EPDCCH formats with different values need to be defined. Table 5 is a schematic table of a quantity of ECCEs occupied by a single EPDCCH in LTE.

TABLE 5

| | Number of ECCEs for one EPDCCH $N_{ECCE}^{EPDCCH}$ (Number of ECCEs for one EPDCCH) | | | |
|---|---|---|---|---|
| | Case A | | Case B | |
| | Localized transmission | Distributed transmission | | |
| EPDCCH format | (Localized transmission) | (Distributed transmission) | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

As shown in Table 5, in the LTE system, there are five EPDCCH formats: 0, 1, 2, 3, and 4, and each format corresponds to a plurality of resource allocation manners and values of $N_{ECCE}^{EPDCCH}$ in the resource allocation manners. In Table 5, in each case, there are two resource allocation manners: localized transmission and distributed transmission. For example, in Case A, when an EPDCCH format is 0 and a resource allocation manner is localized transmission, each EPDCCD occupies two ECCEs; or when an EPDCCH format is 1 and a resource allocation manner is localized transmission, each EPDCCD occupies four ECCEs.

It should be noted that, in this application, number of ECCEs for one EPDCCH $N_{ECCE}^{EPDCCH}$ occupied by a single EPDCCH is equivalent to an aggregation level in EPDCCH transmission. That L represents the aggregation level, namely, $N_{ECCE}^{EPDCCH}$, is used as an example for description below.

In LTE, at a same aggregation level (L), if EPDCCHs of UE (marked as Xp) occupy different quantities of resource blocks (RBs) (marked as $N_{RB}^{X_p}$), EPDCCH candidate quantities included in corresponding search space are also different. Number of EPDCCH candidates that is at each aggregation level and that corresponds to a quantity of RBs occupied by an EPDCCH of the Xp may be marked as $M_p^{(L)}$.

In LTE, the EPDCCH of the Xp may occupy two, four, or eight RBs. Different quantities of RBs occupied by the EPDCCHs of the Xp correspond to different values of $M_p^{(L)}$ included in search space at a same aggregation level. Table 6 and Table 7 are schematic tables of $M_p^{(L)}$ corresponding to different RB quantities at different aggregation levels in different cases.

TABLE 6

| | Number of EPDCCH candidates (Number of EPDCCH candidates) $M_p^{(L)}$ for Case 1 | | | | | Number of EPDCCH candidates $M_p^{(L)}$ for Case 2 | | | | |
|---|---|---|---|---|---|---|---|---|---|---|
| $N_{RB}^{X_p}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

Table 6 shows $M_p^{(L)}$ corresponding to each aggregation level in scenarios in which $N_{RB}^{X_p}$ is 2, 4, and 8 in Case 1 and Case 2. For example, in Case 1, when $N_{RB}^{X_p}$ is 2, $M_p^{(L)}$ corresponding to an aggregation level 2 is 4, and $M_p^{(L)}$ corresponding to an aggregation level 32 is 0. In Case 2, when $N_{RB}^{X_p}$ is 2, $M_p^{(L)}$ corresponding to an aggregation level 1 is 4, and $M_p^{(L)}$ corresponding to an aggregation level 16 is 0.

TABLE 7

| | Number of EPDCCH candidates $M_p^{(L)}$ for Case 3 | | | | |
|---|---|---|---|---|---|
| $N_{RB}^{X_p}$ | L = 1 | L = 2 | L = 4 | L = 8 | L = 16 |
| 2 | 8 | 4 | 2 | 1 | 0 |
| 4 | 4 | 5 | 4 | 2 | 1 |
| 8 | 4 | 4 | 4 | 2 | 2 |

Table 7 shows $M_p^{(L)}$ corresponding to each aggregation level in scenarios in which $N_{RB}^{X_p}$ is 2, 4, and 8 in Case 3. For example, in Case 3, when $N_{RB}^{X_p}$ is 2, $M_p^{(L)}$ corresponding to an aggregation level 2 is 4, and $M_p^{(L)}$ corresponding to an aggregation level 16 is 0.

To implement enhanced coverage of the EPDCCH, in this application, an aggregation level (namely, a quantity $N_{ECCE}^{EPDCCH}$ of ECCEs occupied by each EPDCCH) of the EPDCCH is extended, to obtain an aggregation level corresponding to an EPDCCH format 5 or 6. Table 8 is another schematic table of a quantity of ECCEs occupied by a single EPDCCH in LTE.

TABLE 8

| | Number of ECCEs for one EPDCCH, $N_{ECCE}^{EPDCCH}$ | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | 32 | 32 | 16 | 16 |
| 5 | — | 64 | — | 32 |

As shown in Table 8, in this application, an aggregation level corresponding to an EPDCCH format 4 is added to an aggregation level list shown in Table 5, and the aggregation level corresponding to the EPDCCH format 4 includes an aggregation level 32 corresponding to localized transmission in Case A and an aggregation level 16 corresponding to localized transmission in Case B. Aggregation levels shown in Table 8 further include an aggregation level corresponding to the EPDCCH format 5, and the aggregation level corresponding to the EPDCCH format 5 includes an aggregation level 64 corresponding to distributed transmission in Case A and an aggregation level 32 corresponding to distributed transmission in Case B. In the EPDCCH format 5, the EPDCCH needs to occupy 16 RBs.

Likewise, in this application, an aggregation level (namely, a quantity $N_{ECCE}^{EPDCCH}$ of ECCEs occupied by each EPDCCH) of the EPDCCH is extended, to obtain an aggregation level corresponding to an EPDCCH format 6. Table 9 is another schematic table of a quantity of ECCEs occupied by a single EPDCCH in LTE.

TABLE 9

| EPDCCH format | Number of ECCEs for one EPDCCH, $N_{ECCE}^{EPDCCH}$ | | | |
|---|---|---|---|---|
| | Case A | | Case B | |
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | 32 | 32 | 16 | 16 |
| 5 | 64 | 64 | 32 | 32 |
| 6 | — | 128 | — | 64 |

As shown in Table 9, in this application, an aggregation level corresponding to an EPDCCH format 5 is added to an aggregation level list shown in Table 8, and the aggregation level corresponding to the EPDCCH format 5 includes an aggregation level 64 corresponding to localized transmission in Case A and an aggregation level 32 corresponding to localized transmission in Case B. Aggregation levels shown in Table 9 further include an aggregation level corresponding to the EPDCCH format 6, and the aggregation level corresponding to the EPDCCH format 6 includes an aggregation level 128 corresponding to distributed transmission in Case A and an aggregation level 64 corresponding to distributed transmission in Case B. In the EPDCCH format 6, the EPDCCH needs to occupy 32 RBs.

In an implementation provided in this application, a candidate user table (namely, the search space described in this application) for detection in LTE may be further extended based on extension of the foregoing EPDCCH format, to obtain a candidate user table for detection that is shown in Table 10. Table 10 is an extended EPDCCH candidate user table.

ferent aggregation levels in the two scenarios Case 1 and Case 2. In this application, based on Table 6, an aggregation level L=64 is extended in aggregation levels included in Case 1, and when L=64, $M_p^{(L)}$ corresponding to a value 2, 4, or 8 of $N_{RB}^{X_p}$ is extended. As shown in Table 10, $M_p^{(L)}$ corresponding to each aggregation level when a value of $N_{RB}^{X_p}$ is 16 is further extended in this application. Likewise, an aggregation level L=32 is extended in an EPDCCH candidate user corresponding to Case 2, and when L=32, $M_p^{(L)}$ corresponding to a value 2, 4, or 8 of $N_{RB}^{X_p}$ is extended. As shown in Table 10, in Case 2, $M_p^{(L)}$ corresponding to each aggregation level when a value of $N_{RB}^{X_p}$ is 16 is further extended in this application.

In an implementation provided in this application, a candidate user table for detection in the scenario Case 3 is further extended based on extension of the foregoing EPDCCH format, to obtain a candidate user table for detection that is shown in Table 11. Table 11 is another extended EPDCCH candidate user table.

TABLE 11

| | Number of EPDCCH candidates $M_p^{(L)}$ for Case 3 | | | | | |
|---|---|---|---|---|---|---|
| $N_{RB}^{X_p}$ | L = 1 | L = 2 | L = 4 | L = 8 | L = 16 | L = 32 |
| 2 | 8 | 4 | 2 | 1 | 0 | 0 |
| 4 | 4 | 5 | 4 | 2 | 1 | 0 |
| 8 | 4 | 4 | 4 | 2 | 2 | 0 |
| 16 | 4 | 4 | 4 | 2 | 2 | 1 |

Table 11 is a distributed EPDCCH physical resource set corresponding to UE, and includes EPDCCH candidate quantities corresponding to different RB quantities at different aggregation levels in the scenario Case 3. In this application, based on Table 7, an aggregation level L=32 is extended in aggregation levels included in Case 3, and when L=32, $M_p^{(L)}$ corresponding to a value 2, 4, or 8 of $N_{RB}^{X_p}$ is extended. As shown in Table 11, $M_p^{(L)}$ corresponding to each aggregation level when a value of $N_{RB}^{X_p}$ is 16 is further extended in this application.

In an implementation provided in this application, a candidate user table for detection in LTE is further extended based on extension of the foregoing EPDCCH format, to

TABLE 10

| | Number of EPDCCH candidates $M_p^{(L)}$ for Case 1 | | | | | | Number of EPDCCH candidates $M_p^{(L)}$ for Case 2 | | | | | |
|---|---|---|---|---|---|---|---|---|---|---|---|---|
| $N_{RB}^{X_p}$ | L = 2 | L = 4 | L = 8 | L = 16 | L = 32 | L = 64 | L = 1 | L = 2 | L = 4 | L = 8 | L = 16 | L = 32 |
| 2 | 4 | 2 | 1 | 0 | 0 | 0 | 4 | 2 | 1 | 0 | 0 | 0 |
| 4 | 8 | 4 | 2 | 1 | 0 | 0 | 8 | 4 | 2 | 1 | 0 | 0 |
| 8 | 6 | 4 | 3 | 2 | 1 | 0 | 6 | 4 | 3 | 2 | 1 | 0 |
| 16 | 6 | 4 | 3 | 2 | 2 | 1 | 6 | 4 | 3 | 2 | 2 | 1 |

Table 10 is a distributed EPDCCH physical resource set corresponding to UE, and includes EPDCCH candidate quantities corresponding to different RB quantities at different aggregation levels in the scenario Case 3. In this application, based on Table 7, an aggregation level L=32 is extended in aggregation levels included in Case 3, and when L=32, $M_p^{(L)}$ corresponding to a value 2, 4, or 8 of $N_{RB}^{X_p}$ is extended. As shown in Table 11, $M_p^{(L)}$ corresponding to each aggregation level when a value of $N_{RB}^{X_p}$ is 16 is further extended in this application.

obtain a candidate user table for detection that is shown in Table 12. Table 12 is another extended EPDCCH candidate user table.

TABLE 12

| | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|
| $N_{RB}^{X_p}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 6 | 2 | 2 | 0 | 6 | 6 | 2 | 2 | 0 |
| 16 | 6 | 6 | 2 | 2 | 2 | 6 | 6 | 2 | 2 | 2 |

Table 12 is a localized EPDCCH physical resource set corresponding to UE, and includes EPDCCH candidate quantities corresponding to different RB quantities at different aggregation levels in the two scenarios Case 1 and Case 2. In this application, based on Table 6, an aggregation level L=32 is extended in aggregation levels included in Case 1, and when L=32, $M_p^{(L)}$ corresponding to a value 2, 4, or 8 of $N_{RB}^{X_p}$ is extended. As shown in Table 12, $M_p^{(L)}$ corresponding to each aggregation level when a value of $N_{RB}^{X_p}$ is 16 is further extended in this application. Likewise, an aggregation level L=16 is extended in an EPDCCH candidate user corresponding to Case 2, and when L=16, $M_p^{(L)}$ corresponding to a value 2, 4, or 8 of $N_{RB}^{X_p}$ is extended. As shown in Table 12, in Case 2, $M_p^{(L)}$ corresponding to each aggregation level when a value of $N_{RB}^{X_p}$ is 16 is further extended in this application.

In an implementation provided in this application, a candidate user table for detection in LTE is further extended based on extension of the foregoing EPDCCH format, to obtain a candidate user table for detection that is shown in Table 13. Table 13 is another extended EPDCCH candidate user table.

TABLE 13

| | Number of EPDCCH candidates $M_p^{(L)}$ for Case 3 | | | | |
|---|---|---|---|---|---|
| $N_{RB}^{X_p}$ | L = 1 | L = 2 | L = 4 | L = 8 | L = 16 |
| 2 | 8 | 4 | 2 | 1 | 0 |
| 4 | 6 | 6 | 2 | 2 | 0 |
| 8 | 6 | 6 | 2 | 2 | 0 |
| 16 | 6 | 6 | 2 | 2 | 2 |

Table 13 is a localized EPDCCH physical resource set corresponding to UE, and includes EPDCCH candidate quantities corresponding to different RB quantities at different aggregation levels in the scenario Case 3. In this application, based on Table 7, an aggregation level L=16 is extended in aggregation levels included in Case 3, and when L=16, $M_p^{(L)}$ corresponding to a value 2, 4, or 8 of $N_{RB}^{X_p}$ is extended. As shown in Table 13, $M_p^{(L)}$ corresponding to each aggregation level when a value of $N_{RB}^{X_p}$ is 16 is further extended in this application.

In an implementation provided in this application, a candidate user table for detection in LTE is further extended based on extension of the foregoing EPDCCH format in an application scenario of two physical resource sets (the two physical resource sets may be separately marked as Xp1 and Xp2), to obtain a candidate user table for detection that is shown in Table 14. Table 14 is another extended EPDCCH candidate user table.

TABLE 14

| | | Number of EPDCCH candidates $[M_{p1}^{(L)}, M_{p2}^{(L)}]$ for Case 1 | | | | | | Number of EPDCCH candidates $[M_{p1}^{(L)}, M_{p2}^{(L)}]$ for Case 2 | | | | | |
|---|---|---|---|---|---|---|---|---|---|---|---|---|---|
| $N_{RB}^{Xp1}$ | $N_{RB}^{Xp2}$ | L = 2 | L = 4 | L = 8 | L = 16 | L = 32 | L = 64 | L = 1 | L = 2 | L = 4 | L = 8 | L = 16 | L = 32 |
| 2 | 2 | 4, 4 | 2, 2 | 1, 1 | 0, 0 | 0, 0 | 0, 0 | 4, 4 | 2, 2 | 1, 1 | 0, 0 | 0, 0 | 0, 0 |
| 4 | 4 | 3, 3 | 3, 3 | 1, 1 | 1, 1 | 0, 0 | 0, 0 | 3, 3 | 3, 3 | 1, 1 | 1, 1 | 0, 0 | 0, 0 |
| 8 | 8 | 3, 3 | 2, 2 | 1, 1 | 1, 1 | 1, 1 | 0, 0 | 3, 3 | 2, 2 | 1, 1 | 1, 1 | 1, 1 | 0, 0 |
| 16 | 16 | 3, 3 | 2, 2 | 1, 1 | 1, 1 | 1, 1 | 1, 1 | 3, 3 | 2, 2 | 1, 1 | 1, 1 | 1, 1 | 1, 1 |
| 4 | 2 | 5, 3 | 3, 2 | 1, 1 | 1, 0 | 0, 0 | 0, 0 | 5, 3 | 3, 2 | 1, 1 | 1, 0 | 0, 0 | 0, 0 |
| 8 | 2 | 4, 2 | 4, 2 | 1, 1 | 1, 0 | 1, 0 | 0, 0 | 4, 2 | 4, 2 | 1, 1 | 1, 0 | 1, 0 | 0, 0 |
| 8 | 4 | 3, 3 | 2, 2 | 2, 1 | 1, 1 | 1, 0 | 0, 0 | 3, 3 | 2, 2 | 2, 1 | 1, 1 | 1, 0 | 0, 0 |
| 16 | 2 | 5, 3 | 3, 2 | 1, 1 | 1, 0 | 0, 0 | 1, 0 | 5, 3 | 3, 2 | 1, 1 | 1, 0 | 0, 0 | 1, 0 |
| 16 | 4 | 4, 2 | 4, 2 | 1, 1 | 1, 0 | 1, 0 | 1, 0 | 4, 2 | 4, 2 | 1, 1 | 1, 0 | 1, 0 | 1, 0 |
| 16 | 8 | 3, 3 | 2, 2 | 2, 1 | 1, 1 | 1, 0 | 1, 0 | 3, 3 | 2, 2 | 2, 1 | 1, 1 | 1, 0 | 1, 0 |

Bold items included in Table 14 are extended data in this application. Table 14 is two EPDCCH physical resource sets for distributed transmission that need to be detected by UE, and includes EPDCCH candidate quantities corresponding to different RB quantities at different aggregation levels in the two scenarios Case 1 and Case 2. $N_{RB}^{Xp1}$ is a quantity of RBs occupied by an EPDCCH of the Xp1, $N_{RB}^{Xp2}$ is a quantity of RBs occupied by an EPDCCH of the Xp2, and L is an aggregation level. In the candidate user table for detection that is shown in Table 14, an aggregation level L=64 is extended in aggregation levels included in Case 1, and when L=64, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended, where $M_{p1}^{(L)}$ corresponds to number of EPDCCH candidates corresponding to the Xp1, and $M_{p2}^{(L)}$ corresponds to number of EPDCCH candidates corresponding to the Xp2. As shown in Table 14, in Case 1, an EPDCCH candidate quantity corresponding to each aggregation level when a value of an RB quantity is 16 is further extended in this application. Likewise, an aggregation level L=32 is extended in an EPDCCH candidate user corresponding to Case 2, and when L=32, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended. As shown in Table 14, in Case 2, an EPDCCH candidate quantity corresponding to each aggregation level when a value of an RB quantity is 16 is further extended in this application. For details, refer to specific parameter values described in Table 14. Details are not described herein again.

In an implementation provided in this application, a candidate user table for detection in LTE is further extended based on extension of the foregoing EPDCCH format for Xp1 and Xp2, to obtain a candidate user table for detection that is shown in Table 15. Table 15 is another extended EPDCCH candidate user table.

TABLE 15

| $N_{RB}^{Xp1}$ | $N_{RB}^{Xp2}$ | \multicolumn{6}{c}{Number of EPDCCH candidates $[M_{p1}^{(L)}, M_{p2}^{(L)}]$ for Case 3} | | | | | |
|---|---|---|---|---|---|---|---|
| | | L = 1 | L = 2 | L = 4 | L = 8 | L = 16 | L = 32 |
| 2 | 2 | 2, 2 | 3, 3 | 2, 2 | 1, 1 | 0, 0 | 0, 0 |
| 4 | 4 | 2, 2 | 2, 2 | 2, 2 | 1, 1 | 1, 1 | 0, 0 |
| 8 | 8 | 2, 2 | 2, 2 | 2, 2 | 1, 1 | 1, 1 | 0, 0 |
| 16 | 16 | 2, 2 | 2, 2 | 2, 2 | 1, 1 | 1, 1 | 1, 1 |
| 4 | 2 | 3, 1 | 3, 2 | 3, 1 | 1, 1 | 1, 0 | 0, 0 |
| 8 | 2 | 3, 1 | 4, 1 | 3, 1 | 1, 1 | 1, 0 | 0, 0 |
| 8 | 4 | 2, 2 | 2, 2 | 2, 2 | 1, 1 | 1, 1 | 0, 0 |
| 16 | 2 | 3, 1 | 3, 2 | 3, 1 | 1, 1 | 1, 0 | 1, 0 |
| 16 | 4 | 3, 1 | 4, 1 | 3, 1 | 1, 1 | 1, 0 | 1, 0 |
| 16 | 8 | 2, 2 | 2, 2 | 2, 2 | 1, 1 | 1, 1 | 1, 0 |

Bold items included in Table 15 are extended data in this application. Table 15 is two distributed EPDCCH physical resource sets that need to be detected by UE, and includes EPDCCH candidate quantities corresponding to different RB quantities at different aggregation levels in the scenario Case 3. In the candidate user table for detection that is shown in Table 15, an aggregation level L=32 is extended in aggregation levels included in Case 3, and when L=32, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended. As shown in Table 15, in Case 3, an EPDCCH candidate quantity corresponding to each aggregation level when a value of an RB quantity is 16 is further extended in this application.

In an implementation provided in this application, a candidate user table for detection in LTE is further extended based on extension of the foregoing EPDCCH format in an application scenario of two physical resource sets (including Xp1 and Xp2), to obtain a candidate user table for detection that is shown in Table 16. Table 16 is another extended EPDCCH candidate user table.

Bold items included in Table 16 are extended data in this application. Table 16 is two EPDCCH physical resource sets for localized transmission that need to be detected by UE, and includes EPDCCH candidate quantities corresponding to different RB quantities at different aggregation levels in the two scenarios Case 1 and Case 2. In the candidate user table for detection that is shown in Table 16, an aggregation level L=32 is extended in aggregation levels included in Case 1, and when L=32, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended. As shown in Table 16, in Case 1, an EPDCCH candidate quantity corresponding to each aggregation level when a value of an RB quantity is 16 is further extended in this application. Likewise, an aggregation level L=16 is extended in an EPDCCH candidate user corresponding to Case 2, and when L=16, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended. As shown in Table 16, in Case 2, an EPDCCH candidate quantity corresponding to each aggregation level when a value of an RB quantity is 16 is further extended in this application. For details, refer to specific parameter values described in Table 16. Details are not described herein again.

In an implementation provided in this application, in the scenario Case 3, a candidate user table for detection in LTE is further extended based on extension of the foregoing EPDCCH format in an application scenario of two physical resource sets (including Xp1 and Xp2), to obtain a candidate user table for detection that is shown in Table 17. Table 17 is another extended EPDCCH candidate user table.

TABLE 17

| $N_{RB}^{Xp1}$ | $N_{RB}^{Xp2}$ | \multicolumn{5}{c}{Number of EPDCCH candidates $[M_{p1}^{(L)}, M_{p2}^{(L)}]$ for Case 3} | | | | |
|---|---|---|---|---|---|---|
| | | L = 1 | L = 2 | L = 4 | L = 8 | L = 16 |
| 2 | 2 | 3, 3 | 3, 3 | 1, 1 | 1, 1 | 0, 0 |
| 4 | 4 | 3, 3 | 3, 3 | 1, 1 | 1, 1 | 0, 0 |
| 8 | 8 | 3, 3 | 3, 3 | 1, 1 | 1, 1 | 0, 0 |
| 16 | 16 | 3, 3 | 3, 3 | 1, 1 | 1, 1 | 1, 1 |
| 4 | 2 | 4, 2 | 4, 2 | 1, 1 | 1, 1 | 0, 0 |
| 8 | 2 | 4, 2 | 4, 2 | 1, 1 | 1, 1 | 0, 0 |
| 8 | 4 | 3, 3 | 3, 3 | 1, 1 | 1, 1 | 0, 0 |
| 16 | 2 | 4, 2 | 4, 2 | 1, 1 | 1, 1 | 1, 0 |
| 16 | 4 | 4, 2 | 4, 2 | 1, 1 | 1, 1 | 1, 0 |
| 16 | 8 | 3, 3 | 3, 3 | 1, 1 | 1, 1 | 1, 0 |

Bold items included in Table 17 are extended data in this application. Table 17 is two EPDCCH physical resource sets for localized transmission that need to be detected by UE,

TABLE 16

| $N_{RB}^{Xp1}$ | $N_{RB}^{Xp2}$ | \multicolumn{5}{c}{Number of EPDCCH candidates $[M_{p1}^{(L)}, M_{p2}^{(L)}]$ for Case 1} | | | | | \multicolumn{5}{c}{Number of EPDCCH candidates $[M_{p1}^{(L)}, M_{p2}^{(L)}]$ for Case 2} | | | | |
|---|---|---|---|---|---|---|---|---|---|---|---|
| | | L = 2 | L = 4 | L = 8 | L = 16 | L = 32 | L = 1 | L = 2 | L = 4 | L = 8 | L = 16 |
| 2 | 2 | 4, 4 | 2, 2 | 1, 1 | 0, 0 | 0, 0 | 4, 4 | 2, 2 | 1, 1 | 0, 0 | 0, 0 |
| 4 | 4 | 3, 3 | 3, 3 | 1, 1 | 1, 1 | 0, 0 | 3, 3 | 3, 3 | 1, 1 | 1, 1 | 0, 0 |
| 8 | 8 | 3, 3 | 3, 3 | 1, 1 | 1, 1 | 0, 0 | 3, 3 | 3, 3 | 1, 1 | 1, 1 | 0, 0 |
| 16 | 16 | 3, 3 | 3, 3 | 1, 1 | 1, 1 | 1, 1 | 3, 3 | 3, 3 | 1, 1 | 1, 1 | 1, 1 |
| 4 | 2 | 4, 3 | 4, 2 | 1, 1 | 1, 0 | 0, 0 | 4, 3 | 4, 2 | 1, 1 | 1, 0 | 0, 0 |
| 8 | 2 | 5, 2 | 4, 2 | 1, 1 | 0, 0 | 0, 0 | 5, 2 | 4, 2 | 1, 1 | 0, 0 | 0, 0 |
| 8 | 4 | 3, 3 | 3, 3 | 1, 1 | 1, 1 | 0, 0 | 3, 3 | 3, 3 | 1, 1 | 1, 1 | 0, 0 |
| 16 | 2 | 4, 3 | 4, 2 | 1, 1 | 1, 0 | 1, 0 | 4, 3 | 4, 2 | 1, 1 | 1, 0 | 1, 0 |
| 16 | 4 | 5, 2 | 4, 2 | 1, 1 | 1, 0 | 1, 0 | 5, 2 | 4, 2 | 1, 1 | 1, 0 | 1, 0 |
| 16 | 8 | 3, 3 | 3, 3 | 1, 1 | 1, 1 | 1, 0 | 3, 3 | 3, 3 | 1, 1 | 1, 1 | 1, 0 | and includes EPDCCH candidate quantities corresponding to different RB quantities at different aggregation levels in the scenario Case 3. In the candidate user table for detection that is shown in Table 17, an aggregation level L=16 is extended in aggregation levels included in Case 3, and when L=16, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended. As shown in Table 17, in Case 3, an EPDCCH candidate quantity corresponding to each aggregation level when a value of an RB quantity is 16 is further extended in this application. For details, refer to each parameter shown in Table 17. Details are not described herein again.

In an implementation provided in this application, a candidate user table for detection in LTE is further extended based on extension of the foregoing EPDCCH format in an application scenario of two physical resource sets (including Xp1 and Xp2), to obtain a candidate user table for detection that is shown in Table 18. Table 18 is another extended EPDCCH candidate user table. A data transmission manner corresponding to the Xp1 is localized transmission, and a data transmission manner corresponding to the Xp2 is distributed transmission.

gation level L=32 is extended in an EPDCCH candidate user corresponding to Case 2, and when L=32, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended. As shown in Table 18, in Case 2, an EPDCCH candidate quantity corresponding to each aggregation level when a value of an RB quantity is 16 is further extended in this application. For details, refer to specific parameter values described in Table 18. Details are not described herein again.

In an implementation provided in this application, a candidate user table for detection in LTE is further extended based on extension of the foregoing EPDCCH format in an application scenario of two physical resource sets (including Xp1 and Xp2), to obtain a candidate user table for detection that is shown in Table 19. Table 19 is another extended EPDCCH candidate user table. A data transmission manner corresponding to the Xp1 is localized transmission, and a data transmission manner corresponding to the Xp2 is distributed transmission.

TABLE 18

| | | Number of EPDCCH candidates $[M_{p1}^{(L)}, M_{p2}^{(L)}]$ for Case 1 | | | | | | Number of EPDCCH candidates $[M_{p1}^{(L)}, M_{p2}^{(L)}]$ for Case 2 | | | | | |
|---|---|---|---|---|---|---|---|---|---|---|---|---|---|
| $N_{RB}^{Xp1}$ | $N_{RB}^{Xp2}$ | L = 2 | L = 4 | L = 8 | L = 16 | L = 32 | L = 64 | L = 1 | L = 2 | L = 4 | L = 8 | L = 16 | L = 32 |
| 2 | 2 | 4, 4 | 2, 2 | 1, 1 | 0, 0 | 0, 0 | 0, 0 | 4, 4 | 2, 2 | 1, 1 | 0, 0 | 0, 0 | 0, 0 |
| 4 | 4 | 4, 2 | 4, 3 | 0, 2 | 0, 1 | 0, 0 | 0, 0 | 4, 2 | 4, 3 | 0, 2 | 0, 1 | 0, 0 | 0, 0 |
| 8 | 8 | 4, 1 | 4, 2 | 0, 2 | 0, 2 | 0, 1 | 0, 0 | 4, 1 | 4, 2 | 0, 2 | 0, 2 | 0, 1 | 0, 0 |
| 16 | 16 | 4, 1 | 4, 2 | 0, 2 | 0, 2 | 0, 1 | 1, 1 | 4, 1 | 4, 2 | 0, 2 | 0, 2 | 0, 1 | 1, 1 |
| 2 | 4 | 4, 3 | 2, 4 | 0, 2 | 0, 1 | 0, 0 | 0, 0 | 4, 3 | 2, 4 | 0, 2 | 0, 1 | 0, 0 | 0, 0 |
| 2 | 8 | 4, 1 | 2, 2 | 0, 4 | 0, 2 | 0, 1 | 0, 0 | 4, 1 | 2, 2 | 0, 4 | 0, 2 | 0, 1 | 0, 0 |
| 2 | 16 | 4, 1 | 2, 2 | 0, 4 | 0, 2 | 0, 1 | 0, 1 | 4, 1 | 2, 2 | 0, 4 | 0, 2 | 0, 1 | 0, 1 |
| 4 | 2 | 5, 2 | 4, 2 | 1, 1 | 1, 0 | 0, 0 | 0, 0 | 5, 2 | 4, 2 | 1, 1 | 1, 0 | 0, 0 | 0, 0 |
| 4 | 8 | 4, 1 | 4, 2 | 0, 2 | 0, 2 | 0, 1 | 0, 0 | 4, 1 | 4, 2 | 0, 2 | 0, 2 | 0, 1 | 0, 0 |
| 4 | 16 | 4, 1 | 4, 2 | 0, 2 | 0, 2 | 0, 1 | 0, 1 | 4, 1 | 4, 2 | 0, 2 | 0, 2 | 0, 1 | 0, 1 |
| 8 | 2 | 5, 1 | 4, 2 | 2, 1 | 1, 0 | 0, 0 | 0, 0 | 5, 1 | 4, 2 | 2, 1 | 1, 0 | 0, 0 | 0, 0 |
| 8 | 4 | 6, 1 | 4, 2 | 0, 2 | 0, 1 | 0, 0 | 0, 0 | 6, 1 | 4, 2 | 0, 2 | 0, 1 | 0, 0 | 0, 0 |
| 8 | 16 | 6, 1 | 4, 2 | 0, 2 | 0, 1 | 0, 0 | 0, 1 | 6, 1 | 4, 2 | 0, 2 | 0, 1 | 0, 0 | 0, 1 |

Bold items included in Table 18 are extended data in this application. Table 18 is two physical resource sets that need to be detected by UE and that are respectively localized and distributed, where $M_{p1}^{(L)}$ is number of EPDCCH candidates corresponding to the Xp1 for the localized transmission, and $M_{p2}^{(L)}$ is an EPDCCH physical resource set corresponding to the Xp2 for the distributed transmission. Table 18 includes EPDCCH candidate quantities corresponding to different RB quantities at different aggregation levels in the two scenarios Case 1 and Case 2, where $N_{RB}^{Xp1}$ is a quantity of RBs by an EPDCCH in the Xp1, $N_{RB}^{Xp2}$ is a quantity of RBs by an EPDCCH in the Xp2, and L is an aggregation level. In the candidate user table for detection that is shown in Table 18, an aggregation level L=64 is extended in aggregation levels included in Case 1, and when L=64, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended. As shown in Table 18, in Case 1, an EPDCCH candidate quantity corresponding to each aggregation level when a value of an RB quantity is 16 is further extended in this application. Likewise, an aggre-

TABLE 19

| | | Number of EPDCCH candidates $[M_{p1}^{(L)}, M_{p2}^{(L)}]$ for Case 3 | | | | | |
|---|---|---|---|---|---|---|---|
| $N_{RB}^{Xp1}$ | $N_{RB}^{Xp2}$ | L = 1 | L = 2 | L = 4 | L = 8 | L = 16 | L = 32 |
| 2 | 2 | 4, 1 | 4, 2 | 2, 2 | 0, 1 | 0, 0 | 0, 0 |
| 4 | 4 | 4, 1 | 4, 1 | 2, 2 | 0, 1 | 0, 1 | 0, 0 |
| 8 | 8 | 4, 1 | 4, 1 | 2, 2 | 0, 1 | 0, 1 | 0, 0 |
| 16 | 16 | 4, 1 | 4, 1 | 2, 2 | 0, 1 | 0, 1 | 1, 1 |
| 2 | 4 | 4, 1 | 4, 1 | 2, 2 | 0, 1 | 0, 1 | 0, 0 |
| 2 | 8 | 4, 1 | 4, 1 | 2, 2 | 0, 1 | 0, 1 | 0, 0 |
| 2 | 16 | 4, 1 | 4, 1 | 2, 2 | 0, 1 | 0, 1 | 0, 1 |
| 4 | 2 | 4, 1 | 4, 1 | 2, 2 | 1, 1 | 0, 0 | 0, 0 |
| 4 | 8 | 4, 1 | 4, 1 | 2, 2 | 0, 1 | 0, 1 | 0, 0 |
| 4 | 16 | 4, 1 | 4, 1 | 2, 2 | 0, 1 | 0, 1 | 0, 1 |
| 8 | 2 | 4, 1 | 4, 1 | 4, 1 | 0, 1 | 0, 0 | 0, 0 |
| 8 | 4 | 4, 1 | 4, 1 | 2, 2 | 0, 1 | 0, 1 | 0, 0 |
| 8 | 16 | 4, 1 | 4, 1 | 2, 2 | 0, 1 | 0, 1 | 0, 1 |

Bold items included in Table 19 are extended data in this application. Table 19 is two physical resource sets that need to be detected by UE and that are respectively localized and distributed, where $M_{p1}^{(L)}$ is number of EPDCCH candidates corresponding to the Xp1 for the localized transmission, and $M_{p2}^{(L)}$ is an EPDCCH physical resource set corresponding to the Xp2 for the distributed transmission. Table 19 includes EPDCCH candidate quantities corresponding to different RB quantities at different aggregation levels in the scenario Case 3, where $N_{RB}^{Xp1}$ is a quantity of RBs by an EPDCCH in the Xp1, $N_{RB}^{Xp2}$ is a quantity of RBs by an EPDCCH in the Xp2, and L is an aggregation level. In the candidate user table for detection that is shown in Table 19, an aggregation level L=32 is extended in aggregation levels included in Case 3, and when L=32, EPDCCH candidate quantities $M_{p1}^{(L)}$ and $M_{p2}^{(L)}$ corresponding to a plurality of combinations of a value of $N_{RB}^{Xp1}$ and a value of $N_{RB}^{Xp2}$ are extended. As shown in Table 19, in Case 3, an EPDCCH candidate quantity corresponding to each aggregation level when a value of an RB quantity is 16 is further extended in this application. For details, refer to specific parameter values described in Table 19. Details are not described herein again.

In an implementation described in this application, based on a type (including localized transmission or distributed transmission) of a physical resource occupied by an EPDCCH configured by the base station, a quantity (one or two) of physical resource sets, and a case type corresponding to a current cyclic prefix and a current subframe, the UE may select, with reference to an application scenario to which each candidate user table for detection in Table 6 to Table 19 is applicable, a target candidate user table for detection that is applicable to a scenario in which the UE is currently located. Further, the UE may determine a corresponding EPDCCH candidate user (to be specific, blind detection search space) from the target candidate user table for detection based on a quantity of RBs occupied by the EPDCCH configured by the base station and the aggregation levels supported by the UE, and perform blind detection on the EPDCCH candidate user to obtain the DCI delivered by the base station.

In this application, an EPDCCH candidate user set for detection may be extended, and the quantity of RBs occupied by the EPDCCH and the aggregation levels supported by the UE may be extended, so that the EPDCCH candidate user set may be extended, and a channel coverage area of the EPDCCH may be extended, thereby increasing a channel coverage gain of the EPDCCH.

Figure 9:
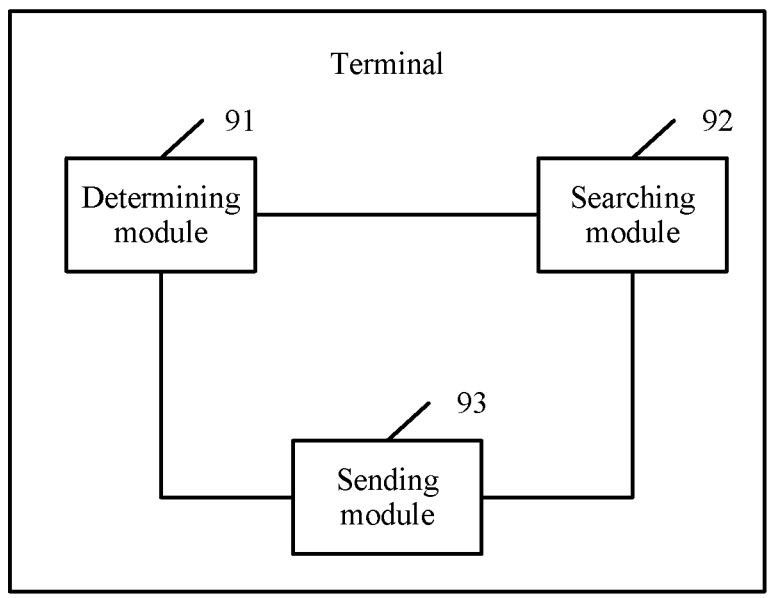
FIG. 9 is a schematic structural diagram of a terminal according to this application.

FIG. 9 is a schematic structural diagram of a terminal according to this application. The terminal provided in this application may include:

a determining module 91, configured to determine predefined search space based on aggregation levels supported by the terminal, where the predefined search space includes search space corresponding to at least one of an aggregation level 16 and an aggregation level 24; and a searching module 92, configured to perform blind detection in the predefined search space determined by the determining module 91 to obtain downlink control information DCI.

In some feasible implementations, the aggregation levels supported by the terminal includes the aggregation level 16;

the predefined search space includes a common search space size and a terminal-specific search space size that correspond to the aggregation level 16, a physical downlink control channel Number of PDCCH candidates corresponding to the common search space size, and a Number of PDCCH candidates corresponding to the terminal-specific search space size;

the common search space size corresponding to the aggregation level 16 is 16, and the Number of PDCCH candidates corresponding to the common search space size is 1; and the terminal-specific search space size corresponding to the aggregation level 16 is 16, and the Number of PDCCH candidates corresponding to the terminal-specific search space size is 1.

In some feasible implementations, the aggregation levels supported by the terminal includes the aggregation level 24;

the predefined search space includes a common search space size and a terminal-specific search space size that correspond to the aggregation level 24, a Number of PDCCH candidates corresponding to the common search space size, and a Number of PDCCH candidates corresponding to the terminal-specific search space size;

the common search space size corresponding to the aggregation level 24 is 24, and the Number of PDCCH candidates corresponding to the common search space size is 1; and the terminal-specific search space size corresponding to the aggregation level 24 is 24, and the Number of PDCCH candidates corresponding to the terminal-specific search space size is 1.

In some feasible implementations, the aggregation levels supported by the terminal includes the aggregation levels 16 and 24;

the predefined search space includes common search space sizes and terminal-specific search space sizes that correspond to the aggregation levels 16 and 24, PDCCH candidate quantities corresponding to the common search space sizes corresponding to the aggregation levels 16 and 24, and PDCCH candidate quantities corresponding to the terminal-specific search space sizes corresponding to the aggregation levels 16 and 24;

the common search space size corresponding to the aggregation level 16 is 16, and the Number of PDCCH candidates corresponding to the common search space size corresponding to the aggregation level 16 is 1;

the terminal-specific search space size corresponding to the aggregation level 16 is 16, and the Number of PDCCH candidates corresponding to the terminal-specific search space size corresponding to the aggregation level 16 is 1;

the common search space size corresponding to the aggregation level 24 is 24, and the Number of PDCCH candidates corresponding to the common search space size corresponding to the aggregation level 24 is 1; and the terminal-specific search space size corresponding to the aggregation level 24 is 24, and the Number of PDCCH candidates corresponding to the terminal-specific search space size corresponding to the aggregation level 24 is 1.

In some feasible implementations, the aggregation levels supported by the terminal includes the aggregation levels 16 and 24;

the predefined search space includes common search space sizes and terminal-specific search space sizes that correspond to the aggregation levels 16 and 24, PDCCH candidate quantities corresponding to the common search space sizes corresponding to the aggregation levels 16 and 24, and PDCCH candidate quantities corresponding to the terminal-specific search space sizes corresponding to the aggregation levels 16 and 24;

the common search space size corresponding to the aggregation level 16 is 16, and the Number of PDCCH candidates corresponding to the common search space size corresponding to the aggregation level 16 is 1;

the terminal-specific search space size corresponding to the aggregation level 16 is 32, and the Number of PDCCH candidates corresponding to the terminal-specific search space size corresponding to the aggregation level 16 is 2;

the common search space size corresponding to the aggregation level 24 is 24, and the Number of PDCCH candidates corresponding to the common search space size corresponding to the aggregation level 24 is 1; and the terminal-specific search space size corresponding to the aggregation level 24 is 48, and the Number of PDCCH candidates corresponding to the terminal-specific search space size corresponding to the aggregation level 24 is 2.

In some feasible implementations, the terminal further includes:

a sending module 93, configured to report, to a base station, at least one aggregation level supported by the terminal, where the DCI is carried on a physical resource corresponding to an aggregation level N in the at least one aggregation level.

In some feasible implementations, the determining module 91 is further configured to:

obtain a broadcast message of the base station, and determine, based on the broadcast message, aggregation levels supported by a cell in which the terminal is located; and the sending module 93 is configured to:

search the aggregation levels supported by the cell for the aggregation levels supported by the terminal, select the at least one aggregation level from the aggregation levels supported by the terminal, and report the selected at least one aggregation level to the base station.

Figure 10:
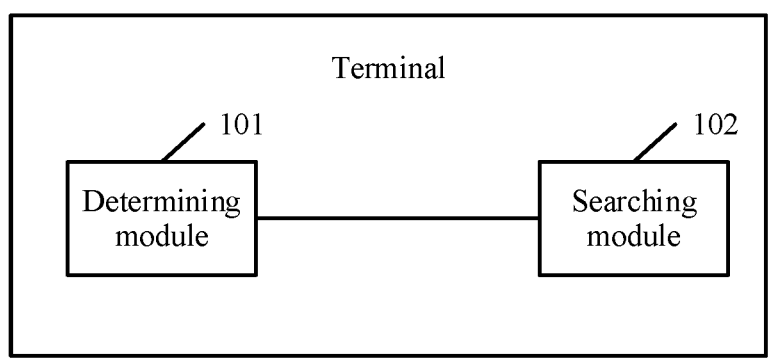
FIG. 10 is another schematic structural diagram of a terminal according to this application.

FIG. 10 is another schematic structural diagram of a terminal according to this application. The terminal provided in this application includes:

a determining module 101, configured to determine blind detection search space of the terminal from predefined search space based on a quantity of resource blocks RB occupied by an enhanced physical downlink control channel EPDCCH and aggregation levels supported by the terminal, where the predefined search space includes search space corresponding to an RB quantity 16; and a searching module 102, configured to perform blind detection in the blind detection search space determined by the determining module to obtain downlink control information DCI.

In some feasible implementations, the predefined search space includes data shown in any one of Table 1 to Table 19.

In some feasible implementations, the predefined search space further includes search space corresponding to an RB quantity 32, and a corresponding aggregation level obtained when the RB quantity is 32 includes 128.

Figure 11:
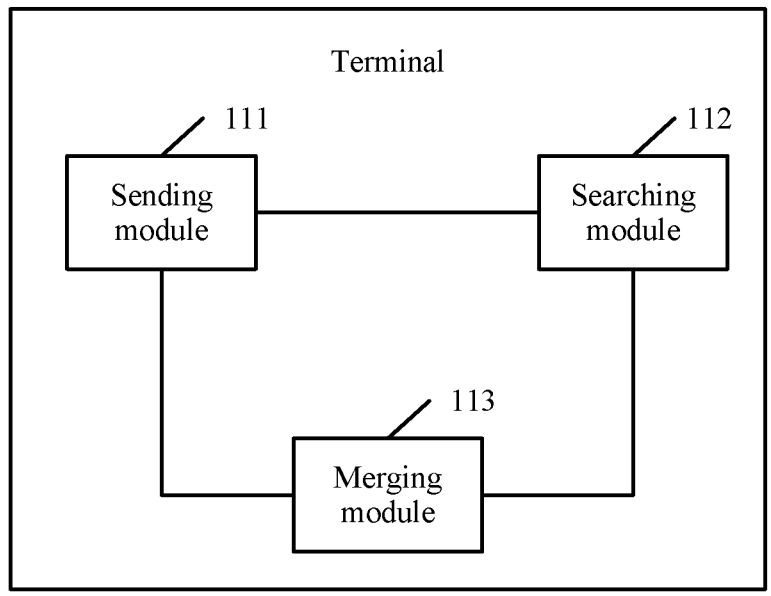
FIG. 11 is another schematic structural diagram of a terminal according to this application.

FIG. 11 is another schematic structural diagram of a terminal according to this application. The terminal provided in this application includes:

a sending module 111, configured to report, to a base station, at least one aggregation level supported by the terminal, where the at least one aggregation level includes an aggregation level N;

a searching module 112, configured to perform, based on each of the at least one aggregation level reported by the sending module 111, blind detection on downlink control information DCI delivered by the base station; and a merging module 113, configured to merge frequency-domain data of two pieces of same DCI carried on two physical downlink control channel PDCCH physical resources when blind detection performed by the searching module 112 on the two pieces of same DCI based on the aggregation level N fails.

The searching module 112 is further configured to perform, based on the aggregation level N, blind detection on a result of merging the frequency-domain data by the merging module 113, to obtain the DCI delivered by the base station.

In some feasible implementations, the sending module 111 is further configured to:

report, to the base station, a message indicating that the terminal has a frequency-domain data merging capability, where the message is provided for the base station to determine whether to repeatedly send the DCI for the terminal on the two PDCCH physical resources corresponding to the aggregation level N.

Figure 12:
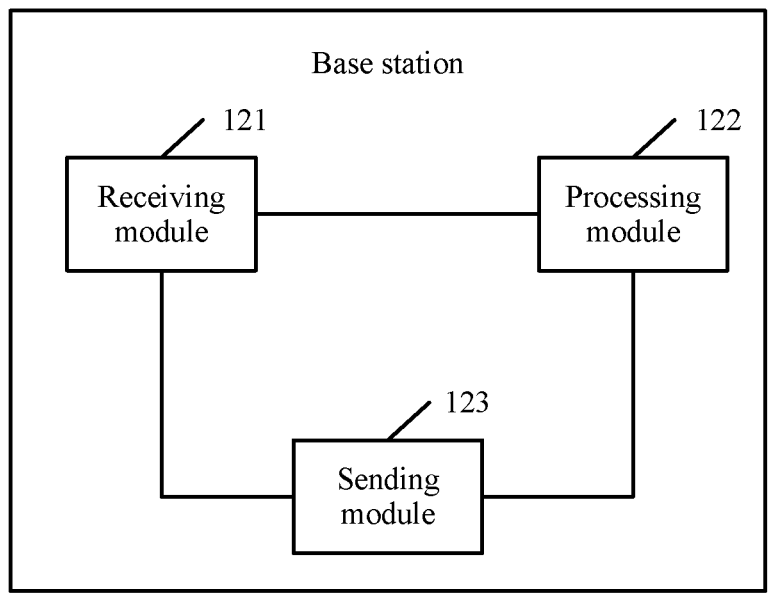
FIG. 12 is a schematic structural diagram of a base station according to this application.

FIG. 12 is a schematic structural diagram of a base station according to this application. The base station provided in this application includes:

a receiving module 121, configured to receive at least one aggregation level that is reported by a terminal and that is supported by the terminal, where the at least one aggregation level includes an aggregation level N;

a processing module 122, configured to split downlink control information DCI used to control the terminal into first DCI and second DCI; and a sending module 123, configured to send the first DCI and the second DCI obtained after processing by the processing module 122 to the terminal, where the first DCI and the second DCI are separately carried on two different physical downlink control channel PDCCH physical resources corresponding to the aggregation level N, and the first DCI and the second DCI are used by the terminal to perform joint parsing, where N is a natural number.

In some feasible implementations, the receiving module 121 is further configured to:

receive a message reported by the terminal, and determine, based on the message, that the terminal has a frequency-domain data merging capability.

In some feasible implementations, the processing module 122 is further configured to:

obtain a preamble of a physical random access channel of the terminal, and determine, based on the preamble, that the terminal has the frequency-domain data merging capability.

Figure 13:
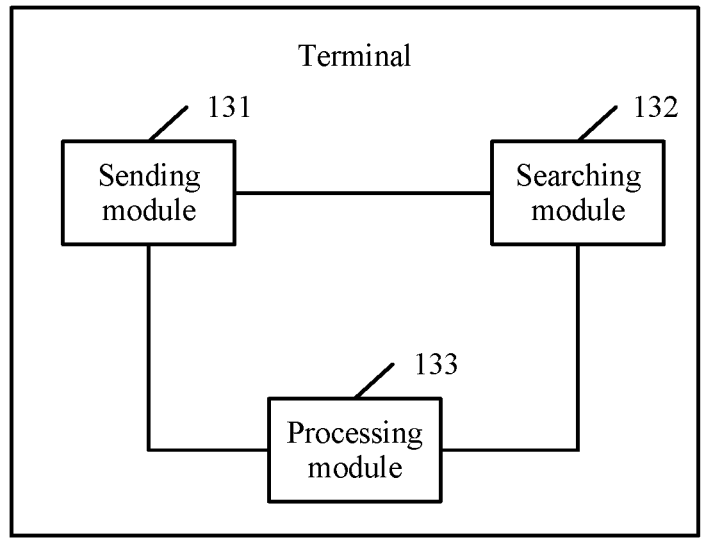
FIG. 13 is a schematic structural diagram of a terminal according to this application.

FIG. 13 is a schematic structural diagram of a terminal according to this application. The terminal provided in this application may include:

a sending module 131, configured to report, to a base station, at least one aggregation level supported by the terminal, where the at least one aggregation level includes an aggregation level N;

a searching module 132, configured to perform, based on each of the at least one aggregation level, blind detection on downlink control information DCI delivered by the base station; and a processing module 133, configured to jointly assemble first DCI and second DCI that are carried on two physical downlink control channel PDCCH physical resources if blind detection performed by the searching module 132 on the first DCI and the second DCI based on the aggregation level N succeeds, to obtain the DCI delivered by the base station.

In some feasible implementations, the sending module 131 is further configured to: report, to the base station, a message indicating that the terminal has a frequency-domain data merging capability.

Figure 14:
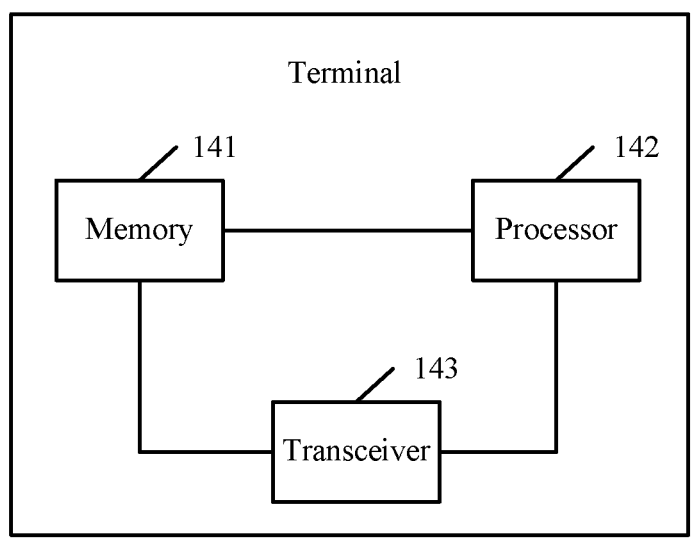
FIG. 14 is another schematic structural diagram of a terminal according to this application.

FIG. 14 is another schematic structural diagram of a terminal according to this application. The terminal provided in this application may include a memory 141, a processor 142, and a transceiver 143. The memory 141, the processor 142, and the transceiver 143 may be connected by using a bus.

The memory 141 includes but is not limited to a random access memory (RAM), a read-only memory (ROM), an erasable programmable read-only memory (EPROM), or a compact disc read-only memory (CD-ROM). The memory 141 is configured to store related program code or data.

The processor 142 may be one or more central processing units (CPUs). When the processor 142 is one CPU, the CPU may be a single-core CPU, or may be a multi-core CPU.

The processor 142 and the transceiver 143 are configured to read the program code stored in the memory 141, to perform an implementation of the terminal described in any one of the foregoing embodiments. Details are not described herein.

Figure 15:
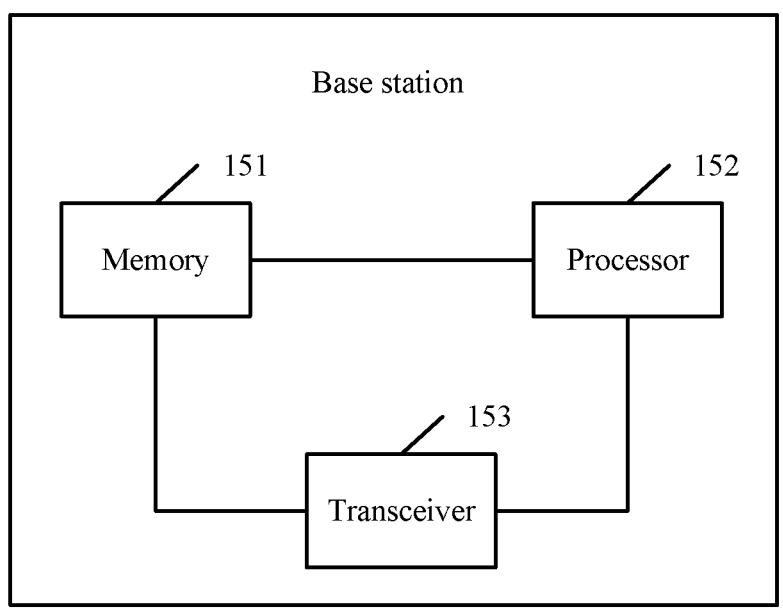
FIG. 15 is another schematic structural diagram of a base station according to this application.

FIG. 15 is another schematic structural diagram of a base station according to this application. The base station provided in this application may include a memory 151, a processor 152, and a transceiver 153. The memory 151, the processor 152, and the transceiver 153 may be connected by using a bus.

The memory 151 includes but is not limited to a RAM, a ROM, an EPROM, and a CD-ROM. The memory 151 is configured to store related program code or data.

The processor 152 may be one or more CPUs. When the processor 152 is one CPU, the CPU may be a single-core CPU, or may be a multi-core CPU.

The processor 152 and the transceiver 153 are configured to read the program code stored in the memory 151, to perform an implementation of the base station described in any one of the foregoing embodiments. Details are not described herein.

In this application, the aggregation levels supported by the cell and the aggregation levels supported by the terminal may be extended to the aggregation level 16 or 24, and the base station may adapt the DCI to be delivered to the UE to a larger physical resource. If an information bit does not change, a PDCCH transmission bit rate is reduced to obtain a PDCCH coverage gain. Therefore, a downlink coverage gain can be increased, diversity of implementations of downlink coverage enhancement can be improved, and applicability is higher. In this application, an EPDCCH candidate user set for detection may be further extended, and the quantity of RBs occupied by the EPDCCH and the aggregation levels supported by the UE may be extended, so that the EPDCCH candidate user set may be extended, and a channel coverage area of the EPDCCH may be extended, thereby increasing a channel coverage gain of the EPDCCH.

Further, in this application, the base station may deliver, on the two different PDCCH physical resources at a same TTI, the DCI for the UE, in other words, the base station may repeatedly deliver, twice at a same TTI, the DCI for the UE. A higher coverage gain is obtained through frequency-domain data merging, an operation is simpler, and applicability is higher. In this application, the base station allocates two candidate physical resources (namely, candidate CCE resources) corresponding to the aggregation level N to the to-be-transmitted DCI. In other words, information bits carried on each candidate user CCE resource corresponding to the aggregation level N are halved. In essence, a transmission bit rate is reduced. A coverage gain is obtained from reducing the bit rate, so that diversity of implementations of coverage enhancement is improved, and applicability is higher.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The storage medium may be a magnetic disk, an optical disc, a read-only memory (ROM), a random access memory (RAM), or the like.

What is claimed is:

1. A method, comprising:
determining, by a terminal, a predefined search space based on aggregation levels supported by the terminal, wherein the predefined search space corresponds to at least one of an aggregation level 16 or an aggregation level 24; and
performing, by the terminal, blind detection in the predefined search space to obtain downlink control information (DCI),
wherein before the determining, by the terminal, the predefined search space based on the aggregation levels supported by the terminal, the method further comprises:
obtaining, by the terminal, a broadcast message of a base station;
determining, by the terminal based on the broadcast message, aggregation levels supported by a cell in which the terminal is located; and
reporting, by the terminal to the base station, at least one aggregation level supported by the terminal, which comprises:
searching, by the terminal, the aggregation levels supported by the cell for the aggregation levels supported by the terminal,
selecting the at least one aggregation level from the aggregation levels supported by the terminal, and
reporting the selected at least one aggregation level supported by the terminal to the base station, wherein the DCI is carried on a physical resource corresponding to a first aggregation level in the at least one aggregation level supported by the terminal.

2. The method according to claim 1, wherein:
the aggregation levels supported by the terminal comprise the aggregation level 16;
the predefined search space comprises a common search space size and a terminal-specific search space size that correspond to the aggregation level 16;
the common search space size corresponding to candidates corresponding to the common search space size is 1; and
the terminal-specific search space size corresponding to the aggregation level 16 is 16, and a number of PDCCH candidates corresponding to the terminal-specific search space size is 1.

3. The method according to claim 1, wherein:
the aggregation levels supported by the terminal comprise the aggregation level 24;
the predefined search space comprises a common search space size and a terminal-specific search space size that correspond to the aggregation level 24;
the common search space size corresponding to the aggregation level 24 is 24, and a number of physical downlink control channel (PDCCH) candidates corresponding to the common search space size is 1; and
the terminal-specific search space size corresponding to the aggregation level 24 is 24, and a number of PDCCH candidates corresponding to the terminal-specific search space size is 1.

4. The method according to claim 1, wherein:
the aggregation levels supported by the terminal comprise the aggregation level 16 and the aggregation level 24;

the predefined search space comprises common search space sizes and terminal-specific search space sizes that correspond to the aggregation level 16 and the aggregation level 24;

the common search space size corresponding to the aggregation level 16 is 16, and a number of physical downlink control channel (PDCCH) candidates corresponding to the common search space size corresponding to the aggregation level 16 is 1;

the terminal-specific search space size corresponding to the aggregation level 16 is 16, and a number of PDCCH candidates corresponding to the terminal-specific search space size corresponding to the aggregation level 16 is 1;

the common search space size corresponding to the aggregation level 24 is 24, and a number of PDCCH candidates corresponding to the common search space size corresponding to the aggregation level 24 is 1; and the terminal-specific search space size corresponding to the aggregation level 24 is 24, and a number of PDCCH candidates corresponding to the terminal-specific search space size corresponding to the aggregation level 24 is 1.

5. The method according to claim 1, wherein the aggregation levels supported by the terminal comprise the aggregation level 16 and the aggregation level 24;

the predefined search space comprises common search space sizes and terminal-specific search space sizes that correspond to the aggregation level 16 and the aggregation level 24;

the common search space size corresponding to the aggregation level 16 is 16, and a number of physical downlink control channel (PDCCH) candidates corresponding to the common search space size corresponding to the aggregation level 16 is 1;

the terminal-specific search space size corresponding to the aggregation level 16 is 32, and a number of PDCCH candidates corresponding to the terminal-specific search space size corresponding to the aggregation level 16 is 2;

the common search space size corresponding to the aggregation level 24 is 24, and a number of PDCCH candidates corresponding to the common search space size corresponding to the aggregation level 24 is 1; and the terminal-specific search space size corresponding to the aggregation level 24 is 48, and a number of PDCCH candidates corresponding to the terminal-specific search space size corresponding to the aggregation level 24 is 2.

6. A method, comprising:

determining, by a terminal, a blind detection search space of the terminal from a predefined search space based on a quantity of resource blocks (RBs) occupied by an enhanced physical downlink control channel (EPDCCH) and aggregation levels supported by the terminal, wherein the predefined search space corresponds to a RB quantity 16; and performing, by the terminal, blind detection in the blind detection search space to obtain downlink control information (DCI);

wherein before the determining, by the terminal, the blind detection search space of the terminal, the method further comprises:

obtaining, by the terminal, a broadcast message of a base station;

determining, by the terminal based on the broadcast message, aggregation levels supported by a cell in which the terminal is located; and reporting, by the terminal to the base station, at least one aggregation level supported by the terminal, which comprises:

searching, by the terminal, the aggregation levels supported by the cell for the aggregation levels supported by the terminal, selecting the at least one aggregation level from the aggregation levels supported by the terminal, and reporting the selected at least one aggregation level supported by the terminal to the base station, wherein the DCI is carried on a physical resource corresponding to a first aggregation level in the at least one aggregation level supported by the terminal.

7. The method according to claim 6, wherein the predefined search space comprises a number of EPDCCH candidates corresponding to the quantity of RBs occupied by the EPDCCH at each aggregation level, as shown in Table 1:

TABLE 1

| $N_{RB}^{X_p}$ | Number of EPDCCH candidates | | | | | |
|---|---|---|---|---|---|---|
| | L = 2 | L = 4 | L = 8 | L = 16 | L = 32 | L = 64 |
| 2 | 4 | 2 | 1 | 0 | 0 | 0 |
| 4 | 8 | 4 | 2 | 1 | 0 | 0 |
| 8 | 6 | 4 | 3 | 2 | 1 | 0 |
| 16 | 6 | 4 | 3 | 2 | 2 | 1 |

$N_{RB}^{X_p}$ represents the quantity of RBs occupied by the EPDCCH, and L represents the aggregation level.

8. The method according to claim 6, wherein the predefined search space comprises a number of EPDCCH candidates corresponding to the quantity of RBs occupied by the EPDCCH at each aggregation level, as shown in Table 2:

TABLE 2

| $N_{RB}^{X_p}$ | Number of EPDCCH candidates | | | | | |
|---|---|---|---|---|---|---|
| | L = 1 | L = 2 | L = 4 | L = 8 | L = 16 | L = 32 |
| 2 | 4 | 2 | 1 | 0 | 0 | 0 |
| 4 | 8 | 4 | 2 | 1 | 0 | 0 |
| 8 | 6 | 4 | 3 | 2 | 1 | 0 |
| 16 | 6 | 4 | 3 | 2 | 2 | 1 | wherein $N_{RD}^{X_p}$ represents the quantity of RBs occupied by the EPDCCH, and L represents the aggregation level.

9. The method according to claim 6, wherein the predefined search space comprises a number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 3:

TABLE 3

| | | Number of EPDCCH candidates $[M_{p1}^{(L)}, M_{p2}^{(L)}]$ | | | | | |
|---|---|---|---|---|---|---|---|
| $N_{RB}^{Xp1}$ | $N_{RB}^{Xp2}$ | L = 2 | L = 4 | L = 8 | L = 16 | L = 32 | L = 64 |
| 2 | 2 | 4, 4 | 2, 2 | 1, 1 | 0, 0 | 0, 0 | 0, 0 |
| 4 | 4 | 3, 3 | 3, 3 | 1, 1 | 1, 1 | 0, 0 | 0, 0 |
| 8 | 8 | 3, 3 | 2, 2 | 1, 1 | 1, 1 | 1, 1 | 0, 0 |
| 16 | 16 | 3, 3 | 2, 2 | 1, 1 | 1, 1 | 1, 1 | 1, 1 |
| 4 | 2 | 5, 3 | 3, 2 | 1, 1 | 1, 0 | 0, 0 | 0, 0 |
| 8 | 2 | 4, 2 | 4, 2 | 1, 1 | 1, 0 | 1, 0 | 0, 0 |
| 8 | 4 | 3, 3 | 2, 2 | 2, 1 | 1, 1 | 1, 0 | 0, 0 |
| 16 | 2 | 5, 3 | 3, 2 | 1, 1 | 1, 0 | 0, 0 | 1, 0 |
| 16 | 4 | 4, 2 | 4, 2 | 1, 1 | 1, 0 | 1, 0 | 1, 0 |
| 16 | 8 | 3, 3 | 2, 2 | 2, 1 | 1, 1 | 1, 0 | 1, 0 | wherein $N_{RB}^{Xp1}$ represents the quantity of RBs occupied by the EPDCCH in the first physical resource set Xp1, $N_{RB}^{Xp2}$ represents the quantity of RBs occupied by the EPDCCH in the second physical resource set Xp2, and L represents the aggregation level.

10. The method according to claim 6, wherein the predefined search search space comprises a number of EPDCCH candidates $M_{p1}^{(L)}$ that is at each aggregation level and that corresponds to a quantity of RBs occupied by an EPDCCH in a first physical resource set Xp1, and number of EPDCCH candidates $M_{p2}^{(L)}$ that is at each aggregation level and that corresponds to a quantity of RBs occupied by an EPDCCH in a second physical resource set Xp2, as shown in Table 4:

TABLE 4

| | | Number of EPDCCH candidates $[M_{p1}^{(L)}, M_{p2}^{(L)}]$ | | | | | |
|---|---|---|---|---|---|---|---|
| $N_{RB}^{Xp1}$ | $N_{RB}^{Xp2}$ | L = 1 | L = 2 | L = 4 | L = 8 | L = 16 | L = 32 |
| 2 | 2 | 4, 4 | 2, 2 | 1, 1 | 0, 0 | 0, 0 | 0, 0 |
| 4 | 4 | 3, 3 | 3, 3 | 1, 1 | 1, 1 | 0, 0 | 0, 0 |
| 8 | 8 | 3, 3 | 2, 2 | 1, 1 | 1, 1 | 1, 1 | 0, 0 |
| 16 | 16 | 3, 3 | 2, 2 | 1, 1 | 1, 1 | 1, 1 | 1, 1 |
| 4 | 2 | 5, 3 | 3, 2 | 1, 1 | 1, 0 | 0, 0 | 0, 0 |
| 8 | 2 | 4, 2 | 4, 2 | 1, 1 | 1, 0 | 0, 0 | 0, 0 |
| 8 | 4 | 3, 3 | 2, 2 | 2, 1 | 1, 1 | 1, 0 | 0, 0 |
| 16 | 2 | 5, 3 | 3, 2 | 1, 1 | 1, 0 | 0, 0 | 1, 0 |
| 16 | 4 | 4, 2 | 4, 2 | 1, 1 | 1, 0 | 1, 0 | 1, 0 |
| 16 | 8 | 3, 3 | 2, 2 | 2, 1 | 1, 1 | 1, 0 | 1, 0 | wherein $N_{RB}^{Xp1}$ represents the quantity of RBs occupied by the EPDCCH in the first physical resource set Xp1, $N_{RB}^{Xp2}$ represents the quantity of RBs occupied by the EPDCCH in the second physical resource set Xp2, and L represents the aggregation level.

11. An apparatus, comprising:
a computer-readable storage medium storing program instructions; and
one or more processors configured to execute the program instructions to cause the apparatus to perform steps comprising:
determining a predefined search space based on aggregation levels supported by the apparatus, wherein the predefined search space corresponds to at least one of an aggregation level 16 or an aggregation level 24; and
performing blind detection in the predefined search space to obtain downlink control information (DCI);
wherein before the determining the predefined search space based on the aggregation levels supported by the apparatus, the steps further comprise:
obtaining a broadcast message of a base station;
determining, based on the broadcast message, aggregation levels supported by a cell in which the apparatus is located; and
reporting, to the base station, at least one aggregation level supported by the apparatus, which comprises:
searching the aggregation levels supported by the cell for the aggregation levels supported by the apparatus,
selecting the at least one aggregation level from the aggregation levels supported by the apparatus, and
reporting the selected at least one aggregation level supported by the apparatus to the base station, wherein the DCI is carried on a physical resource corresponding to a first aggregation level in the at least one aggregation level supported by the apparatus.

12. The apparatus according to claim 11, wherein:
the aggregation levels supported by the apparatus comprise the aggregation level 16;
the predefined search space comprises a common search space size and a terminal-specific search space size that correspond to the aggregation level 16, a physical downlink control channel Number of PDCCH candidates corresponding to the common search space size, and a Number of PDCCH candidates corresponding to the terminal-specific search space size;
the common search space size corresponding to the aggregation level 16 is 16, and the Number of PDCCH candidates corresponding to the common search space size is 1; and
the terminal-specific search space size corresponding to the aggregation level 16 is 16, and the Number of PDCCH candidates corresponding to the terminal-specific search space size is 1.

13. The apparatus according to claim 11, wherein:
the aggregation levels supported by the apparatus comprise the aggregation level 24;
the predefined search space comprises a common search space size and a terminal-specific search space size that correspond to the aggregation level 24;
the common search space size corresponding to the aggregation level 24 is 24, and a number of physical downlink control channel (PDCCH) candidates corresponding to the common search space size is 1; and
the terminal-specific search space size corresponding to the aggregation level 24 is 24, and a number of PDCCH candidates corresponding to the terminal-specific search space size is 1.

14. The apparatus according to claim 11, wherein:
the aggregation levels supported by the apparatus comprise the aggregation levels 16 and 24;
the predefined search space comprises common search space sizes and terminal-specific search space sizes that correspond to the aggregation level 16 and the aggregation level 24;
the common search space size corresponding to the aggregation level 16 is 16, and a number of physical downlink control channel (PDCCH) candidates corresponding to the common search space size corresponding to the aggregation level 16 is 1;
the terminal-specific search space size corresponding to the aggregation level 16 is 16, and a number of PDCCH candidates corresponding to the terminal-specific search space size corresponding to the aggregation level 16 is 1;
the common search space size corresponding to the aggregation level 24 is 24, and a number of PDCCH candidates corresponding to the common search space size corresponding to the aggregation level 24 is 1; and the terminal-specific search space size corresponding to the aggregation level 24 is 24, and a number of PDCCH candidates corresponding to the terminal-specific search space size corresponding to the aggregation level 24 is 1.

15. The apparatus according to claim 11, wherein:

the aggregation levels supported by the apparatus comprise the aggregation levels 16 and 24;

the predefined search space comprises common search space sizes and terminal-specific search space sizes that correspond to the aggregation levels level 16 and the aggregation level 24;

the common search space size corresponding to the aggregation level 16 is 16, and a number of physical downlink control channel (PDCCH) candidates corresponding to the common search space size corresponding to the aggregation level 16 is 1;

the terminal-specific search space size corresponding to the aggregation level 16 is 32, and a number of PDCCH candidates corresponding to the terminal-specific search space size corresponding to the aggregation level 16 is 2;

the common search space size corresponding to the aggregation level 24 is 24, and a number of PDCCH candidates corresponding to the common search space size corresponding to the aggregation level 24 is 1; and the terminal-specific search space size corresponding to the aggregation level 24 is 48, and a number of PDCCH candidates corresponding to the terminal-specific search space size corresponding to the aggregation level 24 is 2.

* * * * *

UNITED STATES PATENT AND TRADEMARK OFFICE
CERTIFICATE OF CORRECTION

PATENT NO.       : 11,044,614 B2
APPLICATION NO.  : 16/522221
DATED            : June 22, 2021
INVENTOR(S)      : Li et al.

It is certified that error appears in the above-identified patent and that said Letters Patent is hereby corrected as shown below:

In the Claims

Claim 10: Column 43, Line 21: "defined search search space comprises a number of" should read
-- defined search space comprises a number of --.

Signed and Sealed this
Second Day of August, 2022

Katherine Kelly Vidal
*Director of the United States Patent and Trademark Office*